US009043474B2

(12) United States Patent
Schleifer et al.

(10) Patent No.: US 9,043,474 B2
(45) Date of Patent: May 26, 2015

(54) COMMUNICATION SESSIONS AMONG DEVICES AND INTERFACES WITH MIXED CAPABILITIES

(75) Inventors: Jason E. Schleifer, Cambridge, MA (US); George Moromisato, Seattle, WA (US); Eric M. Patey, Rockport, MA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 1036 days.

(21) Appl. No.: 12/690,483

(22) Filed: Jan. 20, 2010

(65) Prior Publication Data

US 2011/0179180 A1   Jul. 21, 2011

(51) Int. Cl.
  *G06F 15/16* (2006.01)
  *H04L 12/18* (2006.01)
  *H04L 29/06* (2006.01)

(52) U.S. Cl.
  CPC ........ *H04L 12/1818* (2013.01); *H04L 65/1069* (2013.01); *H04L 65/4053* (2013.01)

(58) Field of Classification Search
  USPC ....................................................... 709/227
  See application file for complete search history.

(56) References Cited

U.S. PATENT DOCUMENTS

| 6,564,261 | B1* | 5/2003 | Gudjonsson et al. ......... 709/227 |
| 2002/0103646 | A1 | 8/2002 | Kochanski et al. |
| 2004/0086100 | A1 | 5/2004 | Moore et al. |
| 2005/0147057 | A1 | 7/2005 | LaDue |
| 2005/0198124 | A1 | 9/2005 | McCarthy |
| 2006/0080432 | A1 | 4/2006 | Spataro et al. |
| 2007/0185957 | A1* | 8/2007 | Mandalia et al. ............. 709/204 |

(Continued)

FOREIGN PATENT DOCUMENTS

| CN | 101005640 A | 7/2007 |
| CN | 101297541 A | 10/2008 |

(Continued)

OTHER PUBLICATIONS

"Hendrickson, Mark", "Fuser: Manage All Your Email and Social Networking Messages in One Place", retrieved at << http://www.techcrunch.com/2007/09/25/fuser-manage-all-your-email-and-social-networking-messages-in-one-place/>>, Sep. 25, 2007. p. 1.

(Continued)

Primary Examiner — El Hadji Sall
(74) Attorney, Agent, or Firm — Dan Choi; Judy Yee; Micky Minhas

(57) ABSTRACT

Users of various devices may participate in communication sessions, but only if the interfaces and components of such devices feature a minimum set of capabilities involved in the communication session type; e.g., in order to participate in a teleconference, the device of every user has to be capable of sending and receiving audio. Instead, a communication session server may automatically convert session items received from each user into interface-specific representations for each other user, based on the capabilities of the interface and device of the other user. For example, speech recognition may transform speech to text output; speech synthesis may transform text input to speech; and video recognition may identify individuals and gestures in a video stream and represent this information as text. The server may therefore host a "mixed" communication session, where each user may fully participate irrespective of the capabilities of the chosen device and interface.

20 Claims, 12 Drawing Sheets

(56) References Cited

U.S. PATENT DOCUMENTS

| | | | |
|---|---|---|---|
| 2007/0192877 A1* | 8/2007 | Yoo et al. | 726/34 |
| 2008/0109208 A1* | 5/2008 | Curry et al. | 704/3 |
| 2008/0147408 A1* | 6/2008 | Da Palma et al. | 704/270.1 |
| 2008/0285587 A1* | 11/2008 | Balk et al. | 370/466 |
| 2009/0006396 A1 | 1/2009 | Dunlap et al. | |
| 2009/0216908 A1 | 8/2009 | Moromisato et al. | |
| 2009/0248695 A1 | 10/2009 | Ozzie et al. | |

FOREIGN PATENT DOCUMENTS

| | | |
|---|---|---|
| CN | 101444116 A | 5/2009 |
| JP | H09214486 A | 8/1997 |
| JP | 2002183064 A | 6/2002 |
| JP | 2003158589 A | 5/2003 |
| JP | 2007041992 A | 2/2007 |
| JP | 2009188809 A | 8/2009 |
| JP | 2009214486 A | 9/2009 |
| WO | 0171543 A2 | 9/2001 |
| WO | 2005041600 A1 | 5/2005 |
| WO | 2009/034609 A1 | 3/2009 |
| WO | 2009034609 A | 3/2009 |
| WO | 2009089585 A1 | 7/2009 |

OTHER PUBLICATIONS

"Kirda, et al", "A Service Architecture for Mobile Teamwork", retrieved at <<http://citeseerx.ist.psu.edu/viewdoc/download-?doi=10.1.1.92.7479&rep=rep1&type=pdf>>, Jul. 15-19, 2002. pp. 6.

"Ferscha, et al", "Pervasive Web Access via Public Communication Walls", retrieved at << http://citeseerx.ist.psu.edu/viewdoc/download?doi=10.1.1.71.9572&rep=rep1&type=pdf>>, Aug. 26-28, 2002. pp. 14.

"International Search Report", Mailed Date: Sep. 22, 2011, Application No. PCT/US2011/020172, Filed Date: Jan. 5, 2011, pp. 8.

First Chinese Office Action cited in Chinese Application No. 201180006523.1 dated Apr. 25, 2014, 12 pgs.

EP Communication cited in EP Application No. 11 734 979.5 dated Sep. 6, 2013, 5 pgs.

Reply EP Communication cited in EP Application No. 11 734 979.5 dated Dec. 27, 2013, 7 pgs.

Network Working Group "Session Initiation Protocol (SIP) Call Control—Conferencing for User Agents", A. Johnston, Avaya, O. Levin, Aug. 2006, reprinted from the Internet at: http://tools.ietf.org/html/rfc4579, 20 pgs.

"A Proposed Architecture for Context-Aware Mobility Management" (Abstract only), Jhoanna Rhodette Pedrasa and A. Seneviratne, Oct. 1, 2007, IEEE International Symposium on Communications and Information Technologies, pp. 729-734.

"Office Action Issued in European Patent Application No. 11734979.5", Mailed Date: Oct. 16, 2014, 9 Pages.

Rosenberg, J., "A Framework for Conferencing with the Session Initiation Protocol (SIP)", In Network Working Group, Feb. 1, 2006, 30 Pages.

Ramanathan, Rajesh, "How Voice Calls work in Office Communications Server (OCS) 2007", Published on: Jul. 1, 2008, Available at: http://technet.microsoft.com/en-us/magazine/2008.07.ocs.aspx#id0360053, 8 pgs.

Ramanathan, Rajesh, "Voice Conferencing in Office Communications Server (OCS) 2007 R2", Published on: Apr. 1, 2009, Available at: http://technet.microsoft.com/en-us/magazine/2009.04.ocs.aspx, 6 pgs.

"Second Office Action Issued in Chinese Patent Application No. 201180006523.1", Mailed Date: Dec. 2, 2014, 8 Pages.

Reply first Chinese Office Action cited in Chinese Application No. 201180006523.1 dated Sep. 1, 2014, 16 pgs.

Reply EP Office Action cited in EP Application No. 11734979.5 dated Feb. 16, 2015, 11 pgs.

"Office Action Received for Japanese Patent Application No. 2012-550020", Mailed Date: Nov. 19, 2014, 14 Pages.

Japanese Office Action cited in Japanese Application No. 2012-5500202 dated Nov. 21, 2014, 7 pgs.

Reply second Chinese Office Action cited in Chinese Application No. 201180006523.1 dated Feb. 23, 2015, 16 pgs.

Reply Japanese Office Action cited in Japanese Application No. 2012-550020 dated Feb. 23, 2015, 12 pgs.

* cited by examiner

COMMUNICATION SESSIONS AMONG DEVICES AND INTERFACES WITH MIXED CAPABILITIES

BACKGROUND

Within the field of computing, many scenarios involve a communication session between two or more users. As a first example, an email conversation involves two or more users who each operate an email interface, such as email client bound to an email account, accessed via a computer having a display and a text entry device, such as a keyboard. As a second example, two users participate in a Short Message Service (SMS) communication session, each operating a mobile device having an SMS client and a display and a text entry component. As a third example, two or more sets of users may participate in a videoconferencing session, where each set of users operates a device that captures the audio and video input from the set of users and presents the audio and video output generated by the other sets of users.

SUMMARY

This Summary is provided to introduce a selection of concepts in a simplified form that are further described below in the Detailed Description. This Summary is not intended to identify key factors or essential features of the claimed subject matter, nor is it intended to be used to limit the scope of the claimed subject matter.

In many communication session scenarios, each user or set of users participating in the communication session operates a device and an interface (such as a web browser, a chat client, an email client, or a videoconferencing application) having particular input and output capabilities. The communication session is established (either through one or more servers, or directly in a peer networking arrangement) among interfaces based on the common capabilities among the interfaces of the users. For example, session items generated by a user are captured by the interface of this user and are transmitted to the devices of other users for output by the interfaces operated therein. In this manner, even if users are operating different interfaces (such as different email clients or different chat interfaces), a communication session may be established among any set of users whose interfaces support a common set of capabilities.

The establishment of communication sessions among a group of users may be complicated by the wide array of devices and interfaces that each user or group of users may utilize to engage in the communication session. Users who wish to engage in a communication session may operate devices having different capabilities and interfaces, such as a mobile phone having a display and a keyboard, a telephone having only voice communication hardware, a netbook having an instant messaging client, and a workstation having a videocamera, a microphone, a display, and speakers. Despite these disparate capabilities and interfaces, the users may wish to form a communication session.

In order to permit the formation of communication sessions among groups of users who operate devices having different interfaces and capabilities, a communication server may be devised that is capable of receiving any session item from any user and rendering interface-specific versions thereof for different users, based on the capabilities of the interfaces operated by such users. As a first example, a first user of a device having a microphone may deliver a session item comprising a voice message, and the communication server may, utilizing speech-to-text recognition, render a text message and present it to a second user of a device that is capable of receiving text, such as an SMS interface of a mobile phone or an email message directed to an email client. Conversely, the second user, as an operator of a device having one of these text interfaces, may transmit a text session item, which the communication server may receive, render as speech using a speech synthesizer, and deliver as a voice session item to the first user. As a second example, for users operating a device having a picture—or video-based output capability (such as a television or a digital photo frame), images may be generated from non-image-based session items (e.g., by rendering photos or video of text) for delivery to such devices. As a third example, a video stream received from and depicting a user may be evaluated through various image analysis techniques, such as face recognition, object recognition, and human gesture recognition, and a description of the people, objects, and physical gestures indicated in the video may be rendered as text or speech for delivery to session participants using devices with capabilities, respectively, of text output or audio output. In this manner, a communication server may permit users of devices featuring a variety of input and output capabilities to engage in a communication session, and may endeavor to render the session items comprising the input of one user into interface-specific formats that are compatible with the output capabilities of the devices of the other session participants.

To the accomplishment of the foregoing and related ends, the following description and annexed drawings set forth certain illustrative aspects and implementations. These are indicative of but a few of the various ways in which one or more aspects may be employed. Other aspects, advantages, and novel features of the disclosure will become apparent from the following detailed description when considered in conjunction with the annexed drawings.

DETAILED DESCRIPTION

Figure 1:
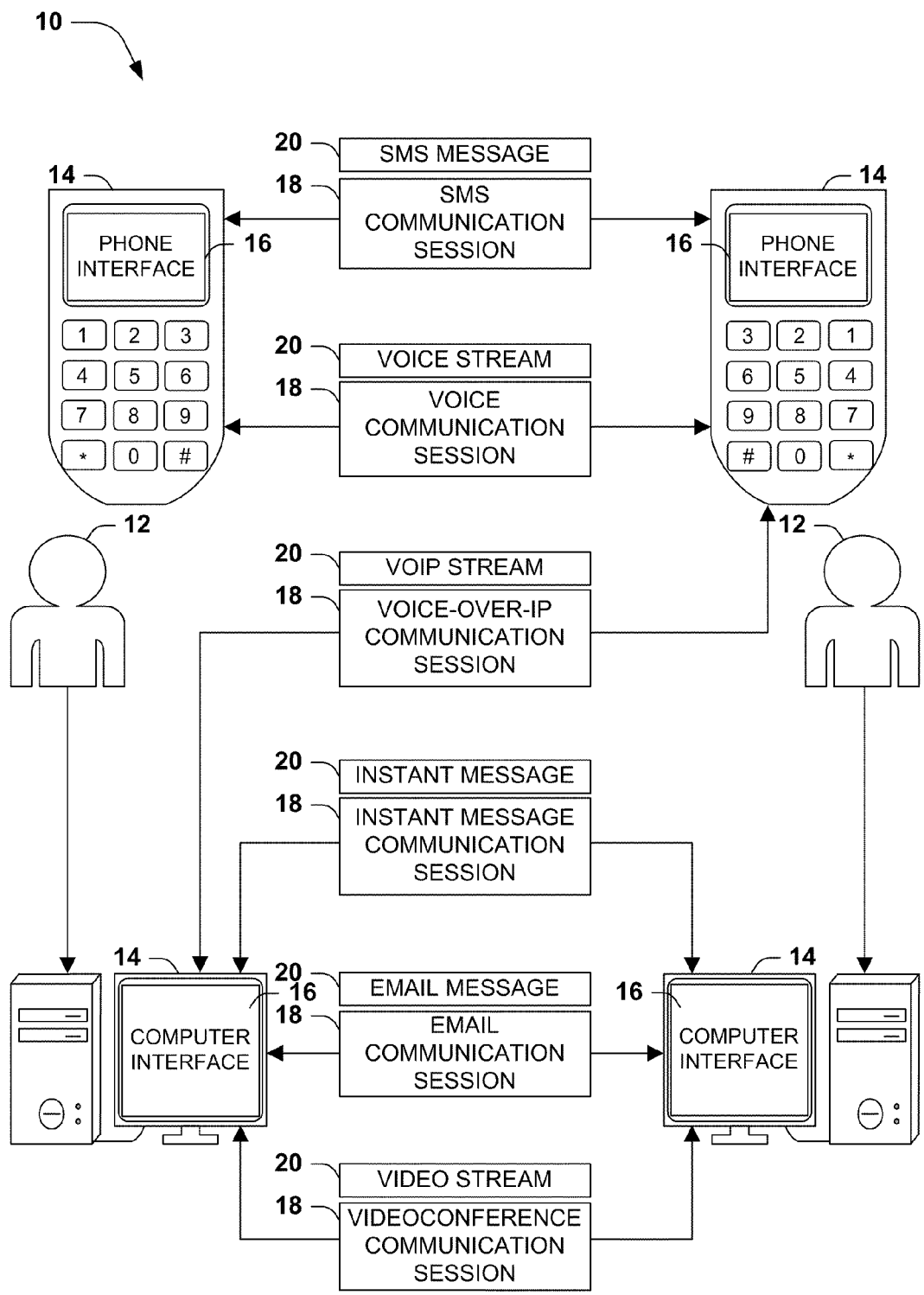
FIG. 1 is an illustration of an exemplary scenario featuring some communication session types that may be established between users of various devices, based on the capabilities of the devices.

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, structures and devices are shown in block diagram form in order to facilitate describing the claimed subject matter.

Within the field of computing, many scenarios involve a communication session established between two or more users (or two or more sets of users participating as a group.) As a first example, a teleconference may be conducted over a telephone network by two or more users of telephone devices, while a voice-over-IP communication session may be conducted over a network by users of devices having voice input and output capabilities. As a second example, users of devices with video input capabilities, such as videocameras, and video output capabilities, such as a television or computer display, may engage in a videoconference, where each user may view the video captured by the devices of the other users. As a third example, a textual communication session may be established over the internet among two or more users operating devices having text input capabilities, such as a keyboard, and a display that may render text output of other users, and may take many forms (such as an instant messaging session, a group chat such as an Internet Relay Chat (IRC) channel, a discussion on a web forum rendered within web browsers of different users, or an email discussion.)

In these and other scenarios, each user (or set of users) operates a device (such as a computer, mobile or landline phone, or a portable device such as a smartphone or mobile text communicator.) Each device may feature a set of hardware components utilized in the communication session, including input devices (such as a text entry component such as a keyboard, a still camera, a videocamera, and a microphone) and output device (such as a text display, a still-image display, a video display, and one or more speakers.) These components may be utilized by an interface to the communication session (such as a web browser, a Simple Message Service (SMS) client, an Internet Relay Chat (IRC) client, an email client, a voice-over-IP (VoIP) client, or a videoconferencing client), which may permit the user to create or connect to a communication session and to send and receive session items (such as text messages, segments of speech, still images, and video streams) that together comprise the content of the communication session.

FIG. 1 presents an exemplary scenario 10 featuring a set of two users 12 who wish to engage in a communication session. Each user 12 operates a set of devices 14, including a first device 14 representing a mobile phone that has a few interfaces 16 that may be operated by the user 12, including a voice interface and an SMS client (involving text entry and text displaying capabilities), and a second device 14 representing workstation having another set of interfaces 16, such as videoconferencing, voice-over-IP, instant messaging, and email clients. In view of these devices 14 and the capabilities thereof, these users 12 may choose to establish many types of communication sessions 18, and to exchange many types of session items 20 therein. As a first example, each user 12 may use a mobile phone to host an SMS communication session 18, where the users 12 may exchange SMS text messages as session items 20. As a second example, each user 12 may use a mobile phone to host a voice communication session 18, where each user 12 generates and sends to the other a voice stream as one or more session items 20 (e.g., a continuous voice stream or a sequence of packets representing voice segments.) As a third example, each user 12 may operate a workstation to engage in an instant messaging communication session 18 comprising one or more instant message session items 20, or an email communication session 18 comprising an exchange of email message session items 20. The users 12 may also choose to operate videocameras connected to each workstation device 14 in order to engage in a videoconference communication session 18 comprising an exchange of video stream session items 20. The users 12 may even choose to engage in the communication session 18 involving different devices 14 with a shared set of capabilities; e.g., a voice-over-IP communication session 18 may be established by the first user 12 operating the workstation device 14 and the second user 12 operating the mobile phone device 14. Despite the hardware differences of these devices 14, the voice-over-IP communication session 18 may be established using the common hardware components and capabilities of each device 14 and interface 16 (e.g., the capability to capture, transmit, receive, and play audio.)

In view of the circumstances of FIG. 1, the users 12 might initiate the communication session 18 by mutually choosing a communication session type (such as an email communication session, voice-over-IP communication session, or a videoconference session), and then, based on the minimum capabilities involved in participating in the selected communication session type, each may choose a device 14 that features these minimum capabilities. However, the users 12 cannot select a communication session type having minimum capabilities that are not fully supported by the devices 14 and interfaces 16 of both users 12; e.g., if the second user 12 chooses to use the phone device 14 and the phone interface 16 that are incapable of sending or receiving video, the users 12 cannot choose a videoconference communication session 18.

In these and other scenarios, users 12 may choose to engage in communication sessions 18 using a variety of devices 14 and interfaces 16, even if each device 14 supports a different set of capabilities. However, each communication session 18 is based on a particular set of capabilities, and only users 12 whose devices 14 and interfaces 16 satisfy the minimum set of capabilities of a particular communication session type may engage in the communication session 18. As a first example, a teleconference communication session 18 depend on the capabilities of audio input and audio output, and a user 12 cannot participate in the teleconference communication session 18 without a device 14 supporting both of these capabilities (or at least one capability, e.g., a user 12 might be able to listen in on a teleconference presentation with a device 14 featuring a speaker but no microphone, but cannot participate in the teleconference.) As a second example, a user 12 of a mobile phone device 14 having only a voice-based interface 18 and only voice capabilities is unable to participate in an SMS communication session, as the device 14 is incapable of sending or receiving SMS text messages. Each type of communication session 18 may have distinct advantages and disadvantages. For example, a textual communication session 18 may be easier to conduct in a noisy environment and may be conducted over a long period when the users 12 are not concurrently available, but may be slower and may lack many nonverbal communication cues. By contrast, a voice communication session 18 may permit quicker interaction with more nonverbal communication cues, but may only transpire when all users 12 are concurrently available in comparatively noise-free environments and at the possible expense of privacy.

In some more sophisticated scenarios, a subset of users 12 of a first communication session 18 utilizing a first set of capabilities might be able to utilize a second set of capabilities to enhance the communication session 18 thereamong. For example, in a group text chat communication session 18 involving an exchange of text message session items 20, a subset of users 12 who have videocameras and/or video presenting capabilities may be able to add videoconferencing thereamong. However, only the subset of users 12 whose devices 14 are capable of sending video streams are permitted to do so, and only to the subset of users 12 whose devices 14 are capable of receiving the video stream. Thus, this additional capability represents the formation of a second communication session 18 among the subset of users 12 having such capabilities; users 12 whose devices 14 and interfaces 16 lack such capabilities can neither send nor receive videoconferencing session items 20, and are effectively excluded from the second communication session 18.

However, many of these limitations of communication sessions 18 may be circumvented. Many automated techniques exist to convert one type of communication to another form of communication, including text-to-speech (speech synthesis), speech-to-text (speech recognition), and handwriting-to-text (handwriting recognition) techniques. Text information may be converted to an image or video by rendering the text as an image. Other techniques may be applied to identify content in a still or video image, including biometric identification techniques that identify known individuals, gesture recognition techniques that identify facial expressions, hand gestures, and body language, and machine vision techniques that identify and describe objects depicted in an image. This extracted information may be converted to text descriptions, which may be presented as text or as rendered speech. Even uncommon techniques may be used to convert information to and from other communications modalities; e.g., a Braille converter may convert text to and from Braille characters.

Figure 2:
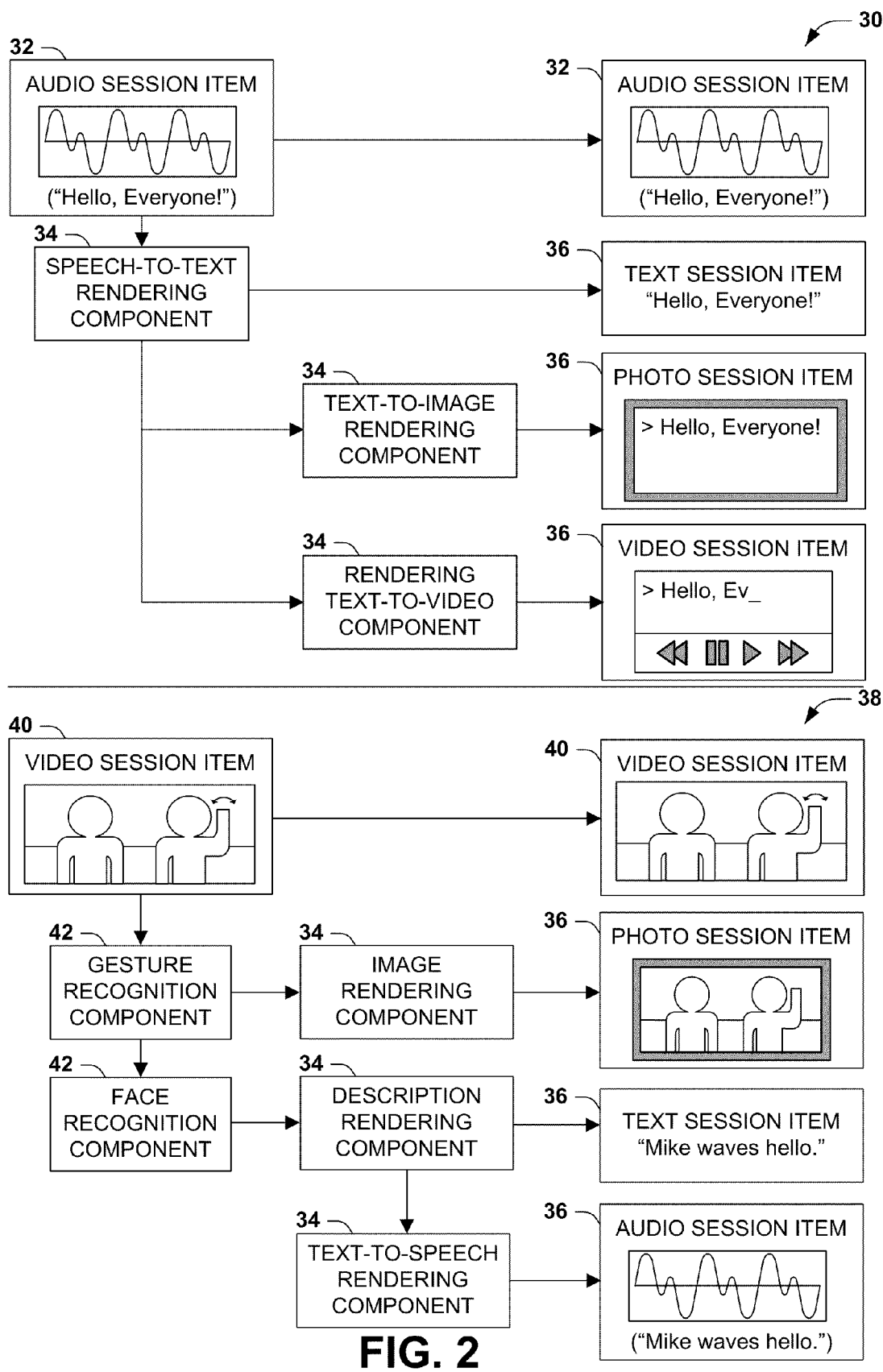
FIG. 2 is an illustration of an exemplary scenario featuring an automated conversion of two session items to different types of session items.

These automated conversion techniques may be applied to transform session items 20 in a communication session 18 from one form into another form. FIG. 2 presents some examples of automated conversion techniques that may facilitate communication sessions. As a first example 30, an audio session item 32 received from a device 14 of a first user 12 of a communication session 18 may be received in the form of a speech segment, and may be transmitted to the devices 14 of other users 12. For devices 14 having interfaces 16 that feature a capability of audio output, the audio session item 32 may be delivered to such devices 12 without alteration. However, for other devices 14, the audio session item 32 may be transformed into other formats using one or more rendering components 34 that apply various automated techniques to the audio session item 32. For example, a speech-to-text rendering component 34 may be utilized to transform the speech encoded in the audio session item 32 into text, which may be rendered as a transformed session item 36 comprising text that corresponds to the speech in the audio session item 32. The converted text might also be converted into an image, using a text-to-image rendering component 34 that renders an image comprising the identified text, and/or to a video that renders a video displaying the identified text (e.g., displayed as if sequentially typed.) These rendered session items 36 may then be delivered to devices 14 having interfaces 16 capable of outputting such session items 36 to the user(s) 12 thereof.

As a second example 38 illustrated in FIG. 2, a video session item 40 received from a first device 14 might be sent in an unmodified form to a second device 14 having an interface 16 capable of displaying video. However, for devices 14 that do not have such an interface 16, various techniques may be utilized to identify significant content visible in the video session item 40, and such significant information may be rendered in various ways. As a first example, the video 40 may be converted to an image by extracting one or more video frames and presenting these frames to a user 12. However, a frequent or periodic extraction might consume significant processing power and/or network capacity for the sending device(s), the receiving device(s), and/or any intermediate servers, and many video frames might not illustrate any activity of interest (e.g., if users are not present or are passively observing the communication session 18.) Instead, video evaluation techniques may be utilized to identify significant activity visible in the video session item 40, such that only images depicting such significant activity might be delivered, thereby increasing the information-to-image ratio and economizing computing resources. For example, a gesture recognition component 42 may be utilized to identify when one or more individuals visible in the video session item 40 performs a significant gesture, such as nodding, smiling, or raising or waving a hand. When such a gesture is identified, a video frame depicting the significant gesture may be extracted by an image rendering component 34, and the extracted image may be presented to a device 14 with an interface 16 capable of displaying images. Additional processing might be applied for other devices 14 and interfaces 16. For example, in addition to identifying a significant gesture, a face recognition component 42 may also be applied to the video session item 40 to identify (using various biometric techniques) the individuals visible in the video. The coupled output from the gesture recognition component 42 and the face recognition component 42 may be utilized to generate a textual description of the content of the video session item 40; e.g., the video segment may depict an individual waving his hand, and the evaluated output may be described as "Mike waves hello." This output may be delivered to a description rendering component 34, which may generate a textual description of the video session item 40 that may be presented as a textual rendered session item 36 to a device 14 having an interface 16 capable of displaying text. Alternatively or additionally, the description may be delivered to a text-to-speech rendering component 34 that generates speech comprising the description, which may be presented as an audio rendered session item 36 to a device 14 having an interface 16 capable of playing audio.

In view of the availability of many automated techniques for converting a session item 20 of a communication session 18 from one format to another (such as in the first example 30 and the second example 38 of FIG. 2), a communication session server may be devised that allows users 12 to join and participate in a communication session 18 despite differences among the devices 14 of the users 12, the interfaces 16 of the respective devices 14, and the capabilities thereof. Instead, the communication session server might comprise a wide variety of conversion techniques, and might therefore host a "mixed" communication session, where each participant uses a device 14 and interface 16 having a particular set of capabilities. The communication session server may be configured to identify the capabilities of each device, and for each session item 20 received from a user 12 participating in the communication session 18, to render the session item 20 as an interface-specific representation, based on the capabilities of each interface 16 of the other users 12. Thus, regardless of the limitations of the device 14 and interface 16, each user 12 may send session items 20 that may be received by all participants of the communication session 18, and may interface-specific representations of session items 20 received from other users 12 (possibly in different formats that are incompatible with the device 14 of the user 12), thus permitting full participation of each user 12 in the communication session 18.

Figure 3:
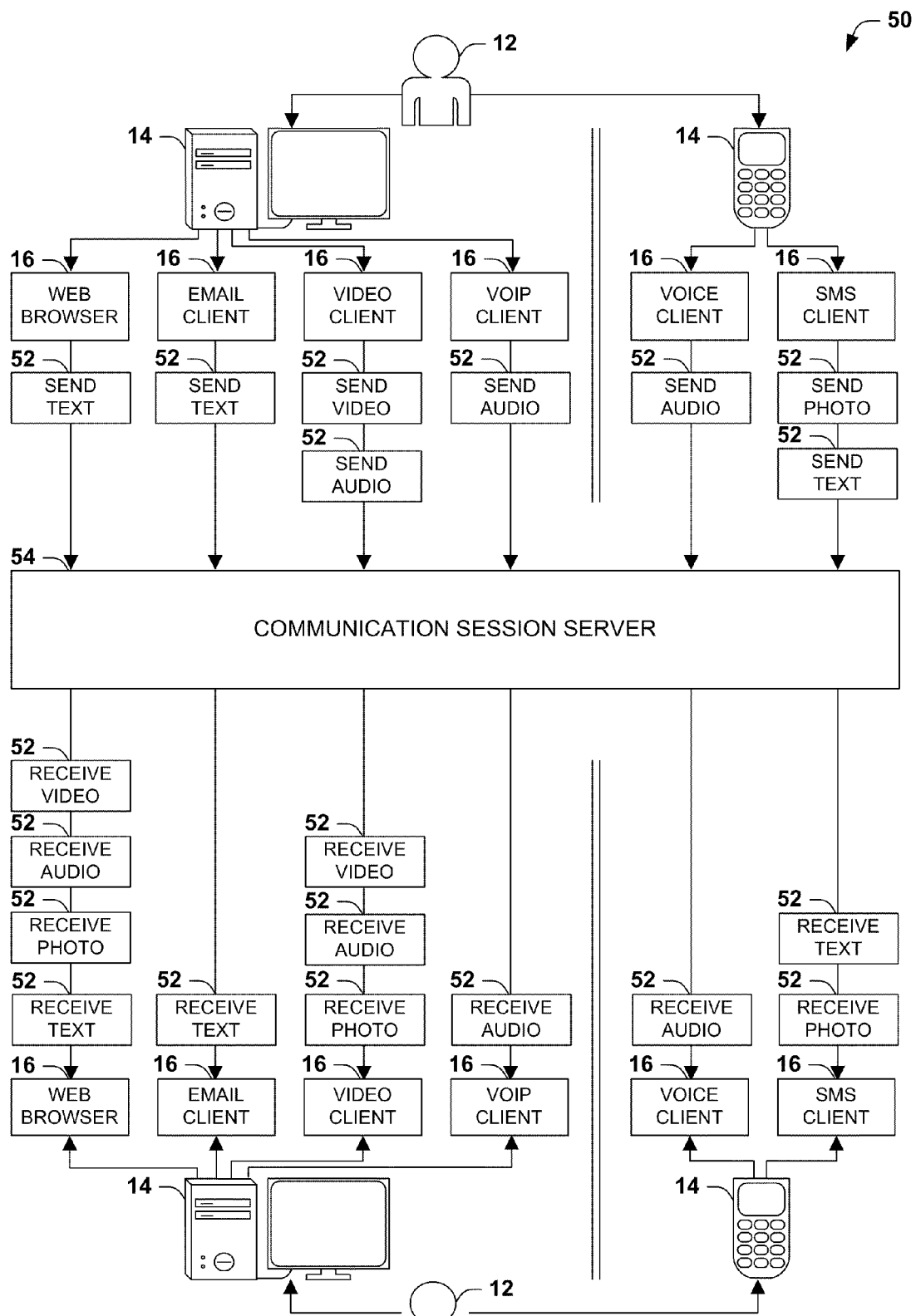
FIG. 3 is an illustration of an exemplary communication session server configured to identify capabilities of interfaces of devices of users in the communication session.

FIG. 3 presents an exemplary scenario 50 illustrating a communication session server 54 configured in this manner to host a communication session 18 among the users 12 of the devices 14 illustrated in FIG. 1. Each user 12 again operates a set of devices 14, including a mobile phone device and a workstation device, each having a different set of input and output hardware components that might be combined in one or more interfaces 16. However, in contrast with the exemplary scenario 10 of FIG. 1, instead of having to choose mutually a communication session type and then choose a device 14 having the minimum capabilities of the chosen communication session type, each user 12 may simply choose to participate in the communication session 18 on either device 14 and with any interface 16. When a user 12 joins the communication session 18 through a particular device 14 and interface 16, the communication session server 54 may identify one or more capabilities 52 of the chosen interface 16 and the chosen device 14. For example, if a user 12 chooses to join the communication session 18 through the voice-over-IP interface 16 of the workstation device 14, the communication session server 54 may identify that the interface 16 has having an audio sending capability 52 and an audio receiving capability 52, and may therefore accept and send session items 20 from and to the user 12 in the form of audio; but if the user 12 chooses to join the communication session 18 through a video client 16 of the workstation device 14, the communication session server 54 might identify the interface 16 as having input capabilities comprising a video sending capability 52 and an audio sending capability 52, and also output capabilities comprising a video receiving capability 52, an audio receiving capability 52, and a picture receiving capability 52. Thus, when a first user 12 (at the top of FIG. 3) sends a session item 20 from a chosen interface 16 of a chosen device 14, the communication session server 54 may receive the session item 20 sent according to one or more of the identified capabilities 52 of the interface 16 and device 14 and render an interface-specific representation of the session item 20 to be sent to the second user 12. For example, when the communication session server 54 receives a session item 20 from the first user 12 to be delivered to the second user 12, the communication session server 54 may identify the type of the session item 20 (according to the sending capabilities 52 of the interface 16 and device 14 of the first user 12) and the types of session items 20 that the second user 12 is capable of receiving (according to the receiving capabilities 52 of the interface 16 and device 14 of the second user 12.) The communication session server 54 may therefore invoke an appropriate rendering technique (such as one of the rendering components 34 illustrated in FIG. 2) to render an interface-specific representation of the session item 20, which may be delivered to the second user 12. As a result of these rendering techniques and capabilities, a communication session server 54 may enable each user 12 to participate in a "mixed" communication session, where each user 12 (or group of users) may use any device 14 and interface 16, and the communication session server 54 may facilitate the communication session 18 by automatically converting each session item 20 to an interface-specific representation on behalf of each other user 12.

Figure 4:
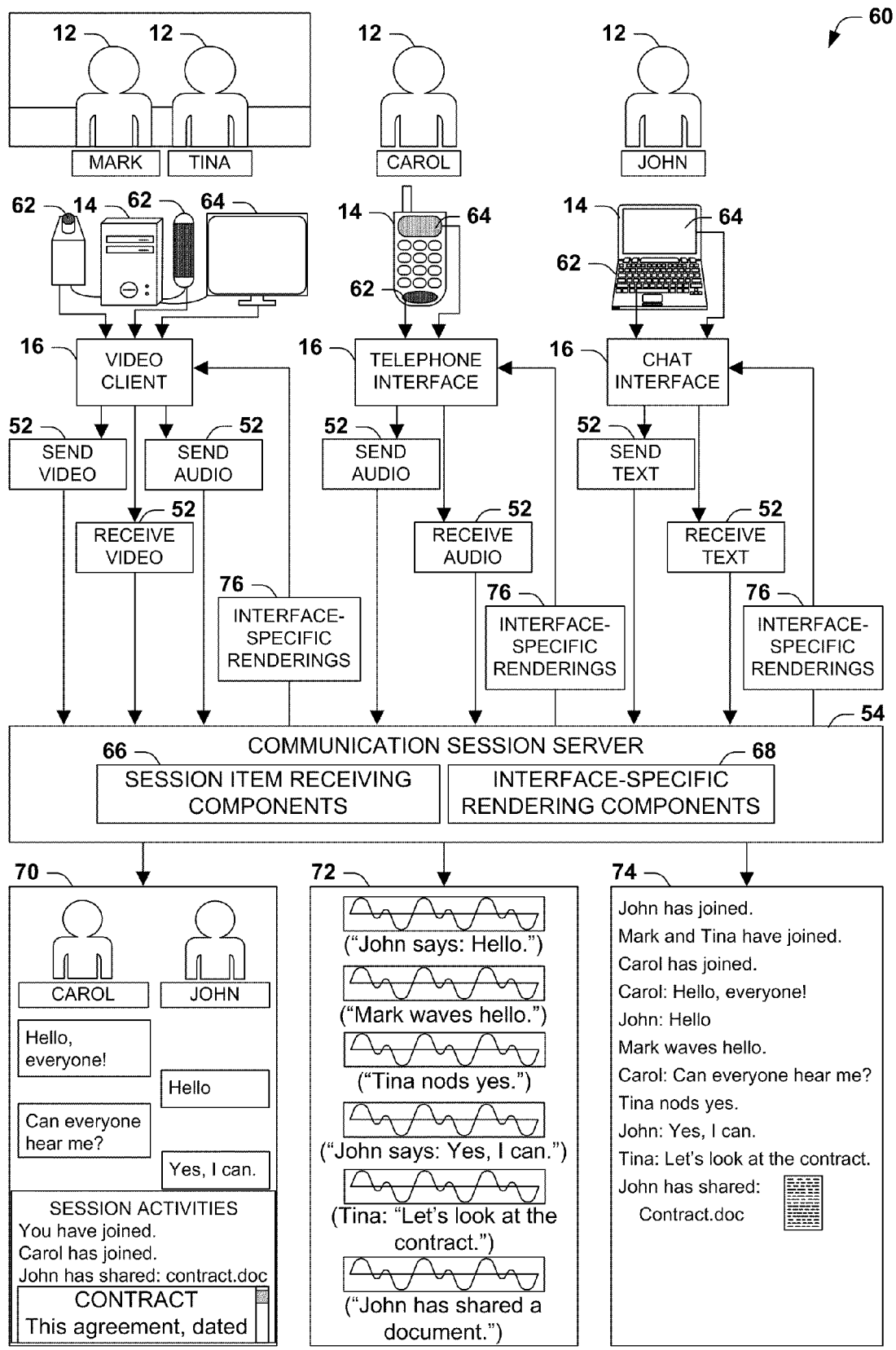
FIG. 4 is an illustration of an exemplary communication session server configured to generate interface-specific representations of session items for various interfaces, and the interface-specific renderings of the communication session resulting therefrom.

FIG. 4 presents an exemplary scenario featuring a "mixed" communication session 60 hosted among a set of users 12 of different devices 14 and interfaces 16, where very few commonalities in the capabilities 52 exist among the devices 14 and interfaces 16 operated among the users 12. In this exemplary scenario, a first user 12 and a second user 12 (named Mark and Tina) together operate a workstation device 14 having some input components 62 (including a camera and a microphone), but only having one output component 64 (a display.) These input components 62 and output components 62 may be exposed to the communication session server 54 through a video client interface 16, and the communication session server 54 may therefore identify the interface 16 of the first user 12 and the second user 12 as having a video sending capability 52 and an audio sending capability 52, as well as a video receiving capability 52. A third user 12 ("Carol") may operate a mobile phone device 14 having only a simple input component 62 (e.g., a microphone) and a simple output component 62 (e.g., a speaker), and a simple telephone interface 16, which the communication session server 54 may identify with an audio sending capability 52 and an audio receiving capability 52. A fourth user ("John") may join the communication session 18 with a portable computer device 14, such as a netbook that has only limited capabilities (e.g., due to economized components or a low-bandwidth network connection), and that presents to the communication session server 54 a chat interface 16 having a text sending input capability 52 and a text receiving output capability 52.

In view of the capabilities 52 of the interfaces 16 of the devices 14 of each user 12, the communication session server 54 may generate, for each interface 16, interface-specific representations 76 of the session items 20 received from the other users 12. For example, the communication session server 54 might comprise one or more session item receiving components 66, which may receive session items 20 of various types, and one or more interface-specific rendering components 68, which may render interface-specific representations 76 of the received session items 20 for delivery to the interfaces 16 of the other users 12. As a first example, the video client interface 16 operated by the first user 12 and the second user 12 may present a video rendering 70 of the communication session 18, which may feature, e.g., a set of avatars representing the third user and the fourth user 12. Because the video client interface 16 only features a video receiving capability 52, the session items 20 received from these users may be rendered as video, e.g., as rendered text, organized horizontally under the avatar of the user 12 who sent the session item 20 and vertically to indicate chronological ordering of the session items 20. In this video rendering 70 may therefore present the audio input received from the third user 12 (and identified, e.g., using a speech recognition technique) and the text input received from the fourth user 12 as video-rendered text. As a second example, the communication session server 54 may deliver to the telephone interface 16 of the second user 12 an audio rendering 72 of the communication session 18, where the text input received from the fourth user 12 is converted to spoken text (e.g., using a speech synthesis technique), and the audio input received from the first user 12 and the second user 12 is directly delivered as audio. Moreover, any gestures that are visible in the video input of the first user 12 and the second user 12 may be identified (e.g., using a gesture identification technique) and associated with the user 12 who made the gesture (e.g., using a biometric identification technique), and descriptions of such gestures may be generated and converted to speech (e.g., using a speech synthesis technique) for inclusion in the audio rendering 72. In a similar manner, the fourth user 12 may receive a textual rendering 74 of the communication session 18, including text representations of the audio of the first user 12 and the second user 12, text descriptions of the gestures of the first user 12 and the second user 12, and text representations of the audio of the third user 12.

FIG. 4 also illustrates additional techniques that may be utilized to promote communication within the communication session 18. For example, the fourth user 12 may choose to share a document with the other users 12 of the communication session 18. However, the interfaces 16 of the other users 12 might not directly accept such documents. For example, the workstation device 14 of the first user 12 and the second user 12 may be unable to store or render the document. Instead, the communication session server 54 may simply render the document as video, which may be delivered to the video client 16 as part of the video of the communication session 18. Similarly, the telephone interface 16 of the third user 12 may be unable to render the document in any meaningful way (e.g., it may be a long document, and presenting a speech rendering of the document to the third user 12 may be unacceptable.) Instead, the communication session server 54 might simply store the document and notify the third user 12 of such sharing. The third user 12 might be able to request a copy of the document at a later date, once the third user 12 is connected to a different device 14 and/or interface 16 that is capable of rendering the document.

As FIG. 4 illustrates, a "mixed" communication session 60 may therefore be established among all users 12, regardless of the device 14 and interface 16 selected thereby. This configuration may alleviate users 12 of having to choose a particular communication session type based on a set of minimum capabilities 52, which may be difficult or indeterminable for a particular set of devices 14 and interfaces 16. Instead, the users 12 may simply choose to have a communication session 18, and each user 12 may connect using a desired device 14 and interface 16. Such "mixed" communication sessions 60 may therefore occur without the users 12 having to discuss, or even know, the capabilities 52 of the devices 12 and interfaces 14 available among the users 12. Moreover, such "mixed" communication sessions 60 may enable each user 12 to select an interface 16 (among an available set of such interfaces 16) that fits the semantics of the conversation for each user 12. For example, a first user 12, present in a noisy or public environment, may choose to participate with a text interface 16, such as a chat client, while a second user 12, communicating in a private and quiet environment, may choose a video interface 16 and/or an audio interface 16. Regardless of which interface 16 each user 12 chooses, the communication session server 54 may endeavor to translate the content and semantics of each user 12 to the other users 12 in a suitable manner. Some embodiments of these techniques may even permit a user 12 to switch interfaces 16 and/or devices 14 within the communication session 18, e.g., to switch from an audio interface to a text interface if the environment becomes noisy.

Figure 5:
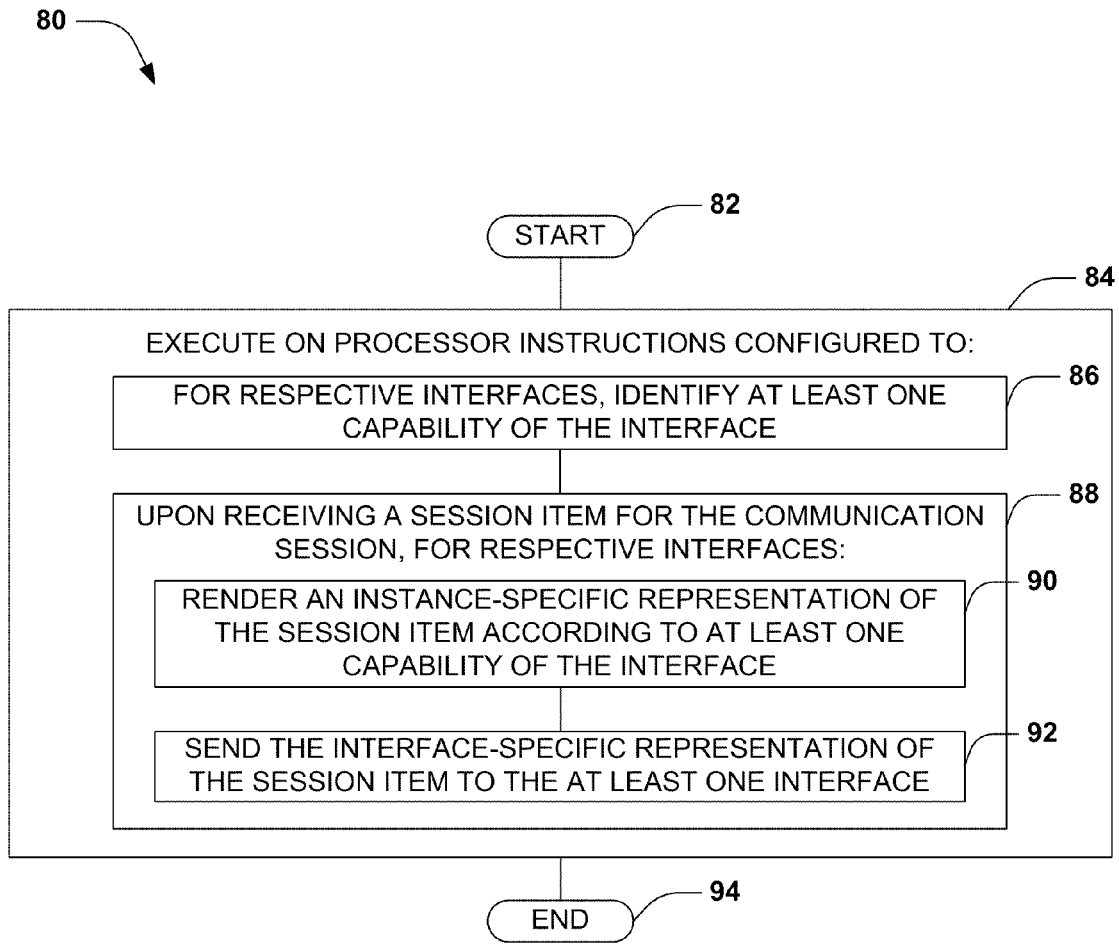
FIG. 5 is a flow chart illustrating an exemplary method of hosting a communication session among a set of users operating a set of devices and interfaces.

FIG. 5 presents a first embodiment of these techniques, illustrated as an exemplary method 80 of hosting a communication session 18 using a processor of a server connected to at least two devices 14 that, respectively, have an interface 16 and are operated by at least one user 12. The exemplary method 80 may be implemented, e.g., as a set of instructions configured to perform the techniques discussed herein, and that are stored in volatile or nonvolatile memory that are executable on the processor of the server. The exemplary method 80 begins at 82 and involves executing 84 the instructions on the processor. In particular, the instructions involve, for respective interfaces 16, identifying 86 at least one capability 52 of the interface 16. The instructions also involve, upon receiving 88 a session item 20 for the communication session 16, for respective interfaces 90, rendering 92 an interface-specific representation 76 of the session item 20 according to at least one capability 52 of the interface 16, and sending 92 the interface-specific representation 76 of the session item 20 to the at least one interface 16. In this manner, the exemplary method 80 causes the instructions so configured to host a "mixed" communication session 60 among the users 12, and so the exemplary method 80 ends at 94.

Figure 6:
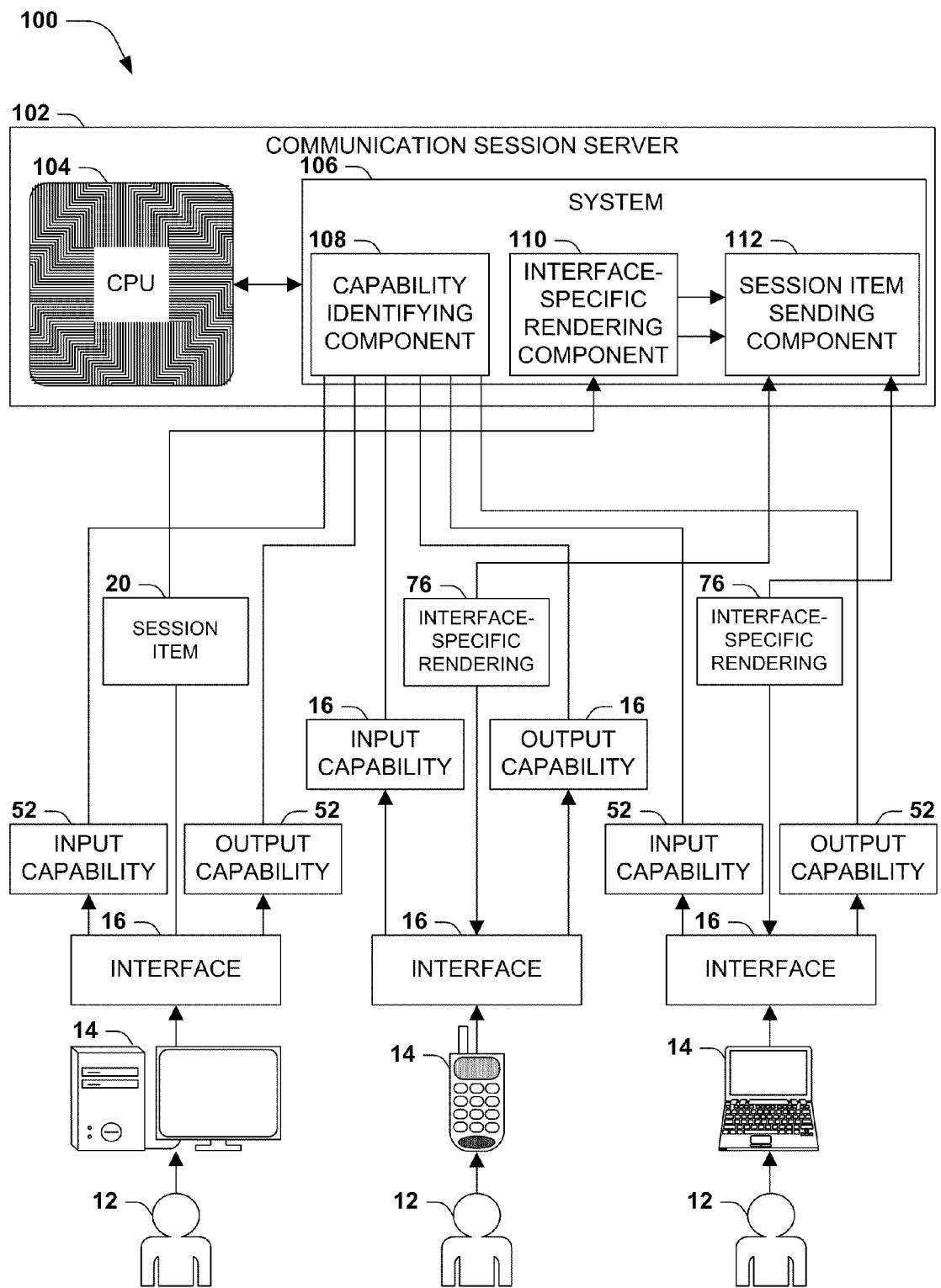
FIG. 6 is a component block diagram illustrating an exemplary system for hosting a communication session among a set of users operating a set of devices and interfaces.

FIG. 6 presents a second embodiment of these techniques, illustrated as an exemplary system 106 operating within a server 102 having a processor 104, and that operates as a communication session server in order to host a communication session 18 among a set of users 12 respectively operating various devices 14 and interfaces 16. The exemplary system 106 may comprise, e.g., a set of software instructions stored in a volatile or non-volatile memory that, when executed by the processor 10 of the server 102, that implement the architecture illustrated in this exemplary system 106. Alternatively, various components of the exemplary system 106 may be implemented in various forms of hardware, e.g., a semiconductor device, such as a circuit, or a field-programmable gate array (FPGA) configured to provide the capabilities of the component within the architecture of the exemplary system 106. The exemplary system 106 comprises a capability identifying component 108, which is configured to, for respective interfaces 16 of the respective devices 14, identify at least one capability 52 of the interface 16. The exemplary system 106 also comprises an interface-specific rendering component 110, which is configured to, upon receiving a session item 20 for the communication session 18, render, for respective interfaces 16, an interface-specific representation 72 of the session item 20 according to at least one capability of the interface 16. The exemplary system 106 also comprises a session item sending component 112, which is configured to send interface-specific representations 72 of session items 20 to the at least one interface 16. In this manner, the components of the exemplary system 106 of FIG. 6 interoperate to host a "mixed" communication session 60 wherein each user 12 may participate regardless of the capabilities 52 of the devices 14 and interfaces 16 utilized thereby.

Figure 7:
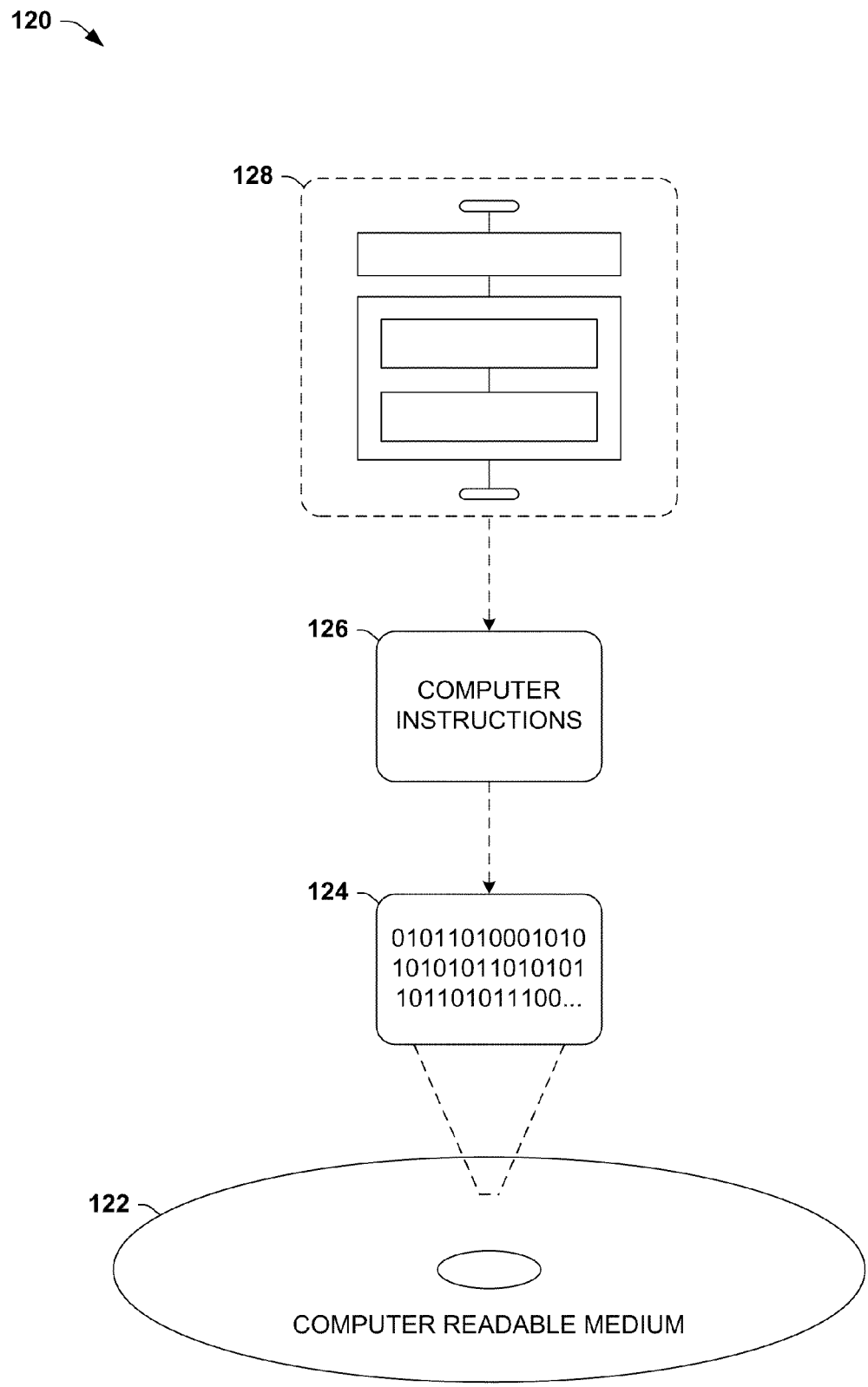
FIG. 7 is an illustration of an exemplary computer-readable medium comprising processor-executable instructions configured to embody one or more of the provisions set forth herein.

Still another embodiment involves a computer-readable medium comprising processor-executable instructions configured to apply the techniques presented herein. An exemplary computer-readable medium that may be devised in these ways is illustrated in FIG. 7, wherein the implementation 110 comprises a computer-readable medium 112 (e.g., a CD-R, DVD-R, or a platter of a hard disk drive), on which is encoded computer-readable data 114. This computer-readable data 114 in turn comprises a set of computer instructions 116 configured to operate according to the principles set forth herein. In one such embodiment, the processor-executable instructions 116 may be configured to perform a method of hosting a communication session among a set of users operating a set of devices and interfaces, such as the exemplary method 80 of FIG. 5. In another such embodiment, the processor-executable instructions 116 may be configured to implement a system for hosting a communication session among a set of users operating a set of devices and interfaces, such as the exemplary system 106 of FIG. 6. Many such computer-readable media may be devised by those of ordinary skill in the art that are configured to operate in accordance with the techniques presented herein.

The techniques discussed herein may be devised with variations in many aspects, and some variations may present additional advantages and/or reduce disadvantages with respect to other variations of these and other techniques. Moreover, some variations may be implemented in combination, and some combinations may feature additional advantages and/or reduced disadvantages through synergistic cooperation. The variations may be incorporated in various embodiments (e.g., the exemplary method 80 of FIG. 5 and the exemplary system 106 of FIG. 6) to confer individual and/or synergistic advantages upon such embodiments.

A first aspect that may vary among embodiments of these techniques relates to the scenarios wherein these techniques may be utilized. As a first example, many types of users 12 may be involved in the communication session 18, including individuals, groups of individuals, devices having various input and output capabilities, and automated processes. As a second example of this first aspect, many types of devices 14 may be utilized by such users 12, such as workstations, notebook computers, palmtop and hiptop computers, personal data assistants (PDAs), mobile phones and other mobile communicators, landline phones, televisions, radios, digital picture displays, and many types of internet appliances. Such devices 14 may also feature many types of input components, including hardware and software keyboards, pointing devices such as mice, touch-sensitive displays, microphones, still cameras, videocameras, geolocation devices, and various types of sensors, and many types of output components, including displays having video, still photo, and/or text output capabilities, speakers, printers, physical feedback components (such as vibration and temperature), and gauges. Some input components might promote the accessibility of the communication session, such as text-to-Braille and Braille-to-text components. As a third example of this first aspect, the devices 14 operated by various users 12 may connect with each other and with the communication session server 54 in various ways, including network connections over a local or wide area network (such as the internet), cellular connections, infrared, and serial or coaxial connections.

As a fourth example of this first aspect, many types of interfaces 16 may be presented by the devices 14, which may tie together the input and output capabilities of the device 14 and the instance-specific representations 76 of session items 20 received from other users 12 in many ways. For example, a device 12 may feature a text input capability 52 (such as a keyboard) and a text output capability 52 (such as a textual display), but many types of interfaces 16 may be implemented to engage the user 12 in the communication session 18 through these capabilities 52. Such interfaces 16 might include, e.g., a Simple Message Service (SMS) or instant messaging (IM) chat client, an email client, and a web browser. Moreover, such interfaces 16 may vary in many respects, e.g., the capability of displaying "threads" of conversation. Such interfaces 16 may also have various semantics; e.g., an instant messaging client may be oriented toward conversations with comparatively short periods between messages among two individuals, while an email client may be oriented toward delayed and possibly protracted conversations among potentially large groups.

As a fifth example of this first aspect, the devices 14 may present various types of capabilities 52 to the communication session server 54. Such capabilities 52 may include input capabilities, such as a text input capability, an audio input capability, an image input capability, a motion video input capability, and an object sending capability (such as the capability to send a file.) These input capabilities may be represented in many ways; for example, text input capabilities may be specified in various languages, and according to various text communication protocols (e.g., instant messaging protocols, Simple Message Service (SMS) protocols, text or hypertext email messages, and handwriting.) These capabilities 52 may also include output capabilities, such as a web rendering capability (e.g., the capability 52 of the device 12 to render hypertext markup language (HTML) documents), a text output capability, an audio output capability, an image output capability, a motion video output capability, and a data object receiving capability (such as the capability to receive and render a particular file.)

A particular scenario wherein these techniques may be utilized involves the use of one or more devices 14 represented in a device "mesh" of a deployable computing environment. Recent attempts have been made to develop techniques for providing access to a computing environment among an array of devices in a consistent, deployable, and extensible manner. These techniques also seek to provide automated synchronization of data objects among all such devices, and the deployment of a common set of applications among the cooperating devices, and a centralized service for managing the procuring, installing, using, and uninstalling of applications among such devices. The set of data objects and applications is not necessarily identical among various devices; e.g., a workstation may contain a full copy of the data set and a large number of high-performance applications (e.g., photo editing software and graphically intensive games), while a cellphone device (having a smaller data store) may store only a subset of the data objects, and may feature portability applications (e.g., a GPS-based mapping software) that are not relevant to a non-portable workstation. However, many applications and data objects related thereto may be shared among such devices (e.g., a calendar application configured to manage a user calendar object), and the computing environment may be adapted to enable the distribution and synchronization of the application and data objects among such devices. It may therefore be appreciated that a computer system may be advantageously represented in a manner that enables the deployment of the computing environment among a set of devices.

In one such technique, the computing environment, including a set of applications, the application resources, and data objects used thereby, is represented in a manner that may be delivered to devices for rendering according to the capabilities of the device. The objects include the data objects of the computer system, such as the user files and data created by the user, as well as representations of the myriad devices comprising the computing environment of the user. A computing environment represented in this manner may be delivered to any device and rendered in a manner suitable for the capabilities of the device. For instance, a workstation may render the information as a robust and general-purpose computing environment, while a public workstation may render a different computing environment experience through a web browser (e.g., as a virtual machine that may be discarded at the end of the user's session), and a cellphone may provide a leaner interface with quicker access to cellphone-related information (e.g., contacts, calendar, and navigation data.) Moreover, updates to the information set (e.g., preference changes and updates to data files contained therein) may be applied to the authoritative source of the information set, and thereby propagated to all other devices to which the information set is delivered.

Figure 8:
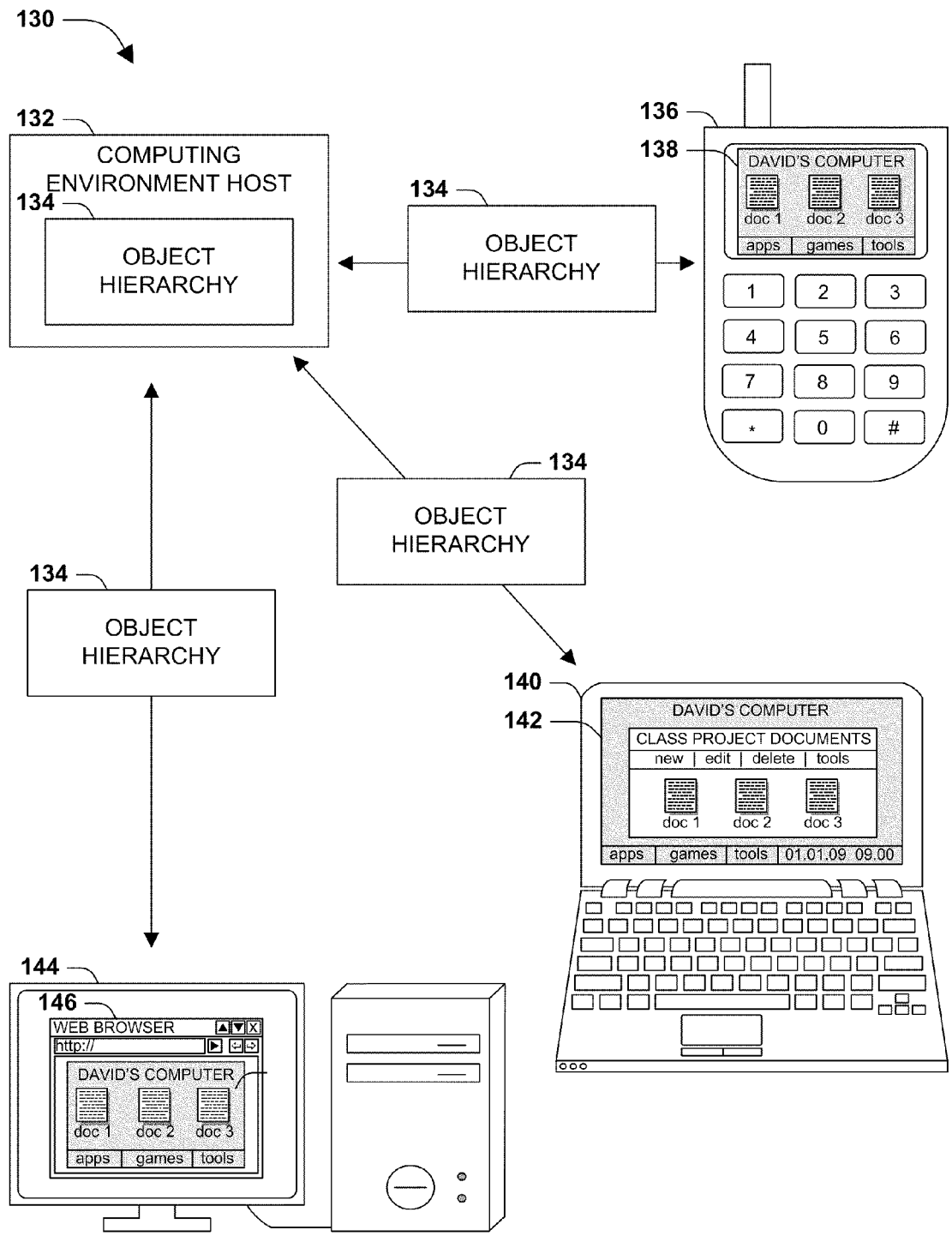
FIG. 8 is an illustration of an exemplary scenario featuring a mesh of devices represented in a deployable computing environment that may be used to engage in a communication session.

FIG. 8 illustrates one such scenario 130, wherein the computing environment may be hosted by a computing environment host 132, which may store and manage an object hierarchy 134. The computing environment host 132 may also render the object hierarchy 134 in different ways on behalf of various devices, such as a cellphone device 136, a personal notebook computer 140, and a public workstation 144, and also on behalf of different types of users having different access privileges. Updates to the computing environment may be propagated back to the computing environment host 132, and may be automatically synchronized with other devices. Hence, the computing environment may therefore be devised and presented as a cloud computing architecture, comprising a device-independent representation (a "cloud") expressed as a consistent rendering across all devices ("clients") that form a mesh of cooperating portals (with device-specific properties) to the same computing environment.

With respect to this exemplary scenario, a user 12 involved in a communication session 18 may utilize one or more devices 14 represented in the mesh, and the communication session server 54 may interact with the mesh in many ways. As a first example, a device 14 may be represented as an object in the object hierarchy 134, and the communication session server 54 may be able to identify the capabilities of the device 14 according to the details of the device 14 stored in the object hierarchy 134. As a second example, the user 12 participating in the communication session 18 may switch from a first device 14 represented in the mesh to a second device 14 represented in the mesh. The communication session server 54 may be configured to detect such changes, and to adjust the rendering of the communication session 18 for the user 12 according to the details of the second device 14, while also presenting the interface-specific representations 76 to the second device 14 in a manner that may be consistently rendered with respect to the computing environment. As a third example, the user 12 may request to share with other users 12 within the communication session 18 one or more objects represented in the object hierarchy 134, which may be stored, e.g., on a different device 12 than currently used by the user 12 to participate in the communication session 18. The communication session server 54 may then have to interact with the mesh to retrieve the object for sharing with the other users 12. In these and other ways, the communication session server 54 may be configured to interact with the mesh environment in relation to the rendering of the communication session 18 for the user 12. Those of ordinary skill in the art may devise many scenarios wherein the techniques presented herein might be advantageously utilized.

A second aspect that may vary among embodiments of these techniques relates to variations in the architecture of such embodiments. As a first example, the exemplary system 106 of FIG. 6 presents one such architecture, but other architectures may be devised and may have advantages with respect to other architectures. For example, a centralized architecture might provide a centralized communication session service to an entire set of devices 14 and users 12 involved in one or more communication sessions 18, while a distributed architecture might enable each device 14 to include part or all of an embodiment of these techniques. An even more distributed architecture might resemble a peer-to-peer network, wherein each device 14 might be configured to translate session items 20 generated by an interface 16 into a generic session item 20, and/or to receive generic session items 20 and render them for presentation to the interface 16 as an interface-specific representation 76.

As a second example of this second aspect, the communication session server 54 may be configured to identify the capabilities 52 of various devices 14 and interfaces 16 in many ways. For example, one or more devices 14 might proactively identify the capabilities 52 of the interface 16, e.g., by sending to the communication session server 54 an interface descriptor that includes a list of capabilities 52 of the interface 16. Alternatively or additionally, the communication session server 54 might query a device 14 and/or interface 16 for a particular capability 52; e.g., the communication server 54 might send a test video signal to a device 14, and may detect whether the device 14 is capable of rendering the video (e.g., by asking the user 12 to respond in a particular way if the video is correctly displayed.)

As a third example of this second aspect, the communication session server 54 may render instance-specific representations 52 of session items 20 in many ways. For example, the interface-specific rendering component 110 may be devised, e.g., as a set of components configured to translate a session item 20 presented in a first communication modality (e.g., a text message) into an interface-specific representation 54 in a second communication modality (e.g., an audio message.) This architecture might feature components such as a text-to-speech renderer, a speech-to-text renderer, a video-to-text renderer, a video-to-image renderer, etc. Alternatively or additionally, the interface-specific rendering component 110 may be devised, e.g., as a set of input components configured to translate a session item 20 into a generic session item, and a set of output components configured to translate the generic session item into an interface-specific representation 52. This architecture might feature a set of input components such as a text interpreter, a handwriting recognition component, a speech recognition component, a gesture recognizing component, and a biometric recognition component, and a set of output components such as a text rendering component, an image rendering component, a speech rendering component, and a video rendering component.

As a fourth example of this second aspect, the instance-specific representations 76 may be delivered to the interfaces 16 of the users 12 in many ways. For example, a communication session server 54 may accept a session item 20 and render an instance-specific representation 76 thereof for the interface 16 of each device 14. This embodiment might be useful, e.g., in distributed architectures, where each device 14 may be configured to render the interface-specific representations 76 of generic session items distributed by a server or in a peer-to-peer manner. Alternatively, the communication session server 54 might identify a group of two or more interfaces 16 having a common sets of capabilities 52, and may generate one interface-specific representation 76 of the session item 20 for each group. This embodiment may be useful, e.g., where a large number of users 12 are present in the communication session 18, and where the rendering of an interface-specific representation 76 might result in many redundant renderings of a session item 20 in the same manner for multiple users 12 using interfaces 16 with similar capabilities. Those of ordinary skill in the art may devise many architectures whereby the techniques discussed herein may be implemented.

A third aspect that may vary among embodiments of these techniques relates to the management of the communication session 18 by the communication session server 54. In simpler embodiments of these techniques, the communication session server 54 may simply permit users 12 to connect interfaces 16 to form a communication session 18, which may be initiated when at least two interfaces 16 connect and may continue to exist as long as such connection remains. In more sophisticated embodiments, the communication session server 54 may participate in the creation and management of the communication session 18, and may facilitate such added capabilities as administration of the communication session 18, the authentication of users 12, and the persistence of the communication session 18 through the joining and exiting of various users 12, possibly even including the persistence of the communication session 18 after all users 12 have exited.

As a first example of this third aspect, the communication session server 54 may participate in the management of the state of the communication session 18. For example, the communication session server 54 may be configured initiate the communication session 18 (e.g., instead of simply waiting for users 12 to initiate the communication session 18, the communication session server 54 may spontaneously initiate a virtual "room" or allocate resources for the communication session 18 at a scheduled time.) The communication session server 54 might also assist in the adding and removing of users 12 to and from the communication session 18. For example, upon receiving a request from at least one user 12 of a device 14 to join the communication session 18, the communication session server 54 may join the user(s) 12 of the device 14 with the communication session 18 (e.g., by announcing the arrival of the newly arriving user(s) 12); and upon receiving a request from at least one user 12 of a device 14 to exit the communication session 18, the communication session server 54 may exit the user(s) 12 of the device 14 from the communication session 18 (e.g., by announcing the departure of the exiting user(s) 12.) The communication session server 54 may also be configured, upon exiting all users 12 from a communication session 18, to terminate the communication session 18. Alternatively, the communication session server 54 may be configured to persist the communication session 18 for a period, even after all users 12 have exited, in case some users 12 later enter or reenter the communication session 18.

As a second example of this third aspect, the communication session server 54 may participate in the identity authentication or anonymizing of various users 12 within the communication session 18. For example, the communication session server 54 may host one or more user profiles, each of which may include a description of one or more users 12, and/or a set of roles or capabilities that the user 12 may have in the communication session 18. Alternatively, these user profiles and/or capabilities might be held by a particular user 12, e.g., in a certificate generated by an identity server and that is verifiable by the communication session server 54. Moreover, a user profile may be verified according to one or more authentication credentials, such as a password, a biometric measurement, or a digital certificate, which the communication session server 54 may verify before associating a user 12 with a user profile. Accordingly, upon receiving a request from at least one user 12 join the communication session 18 with a particular user profile, the communication session server 54 may receive from the user(s) 12 at least one authorization credential, and may join the user(s) to the communication session 18 with the user profile upon verify the authorization credential with the user profile. Alternatively or additionally, the communication session server 54 may include an anonymous user profile, and may permit one or more users 12 to request to join the communication session 18 with the anonymous user profile. Moreover, the communication session server 54 might promote the anonymizing of a user 12 joining with an anonymous user profile, e.g., by obscuring the internet protocol (IP) address or telephone number of the user 12 from other users 12 in the communication session 18, and/or by disguising the voice and/or video of the session items 20 sent by the user 12.

As a third example of this third aspect, the communication session server 54 may participate in the assignment of roles to various users 12. For example, users 12 in a communication session 18 may be assigned to various roles, such as an administrator role for users 12 who are permitted to alter the state of the communication session 18 (such as initiating or terminating the communication session 18 and inviting or excluding participants); a participant role for users 12 who are permitted to send session items 20 to the communication session server 54 (e.g., who are permitted to appear, speak, deliver text, and/or submit objects to the communication session 18); and an observer role for users 12 who are permitted to receive interface-specific representations 76 of the session items 20. Moreover, these roles may be represented as session capabilities associated with a user profile. For example, when a user 12 is assigned to a particular user profile, the user profile may specify the session capabilities of the user 12 during the communication session 18. In one such embodiment, a user 12 may be associated with profile-specific capabilities, e.g., the capabilities 52 of the user 12 that the communication session server 54 is to utilize while exchanging session items 20 with the user 12. These profile-specific capabilities may be specified by the user 12 as the desired set of capabilities that the user 12 wishes to utilize for the user profile (e.g., only text input and text output capabilities 52 when participating in an anonymous role, but video and/or voice input and output capabilities when participating in a non-anonymous role), or may be assigned by another user 12, such as an administrator (e.g., specifying that high-priority observers may receive video interface-specific representations 52 of session items, and that low-priority observers may only receive textual interface-specific representations 52 of session items 20.) In either case, when a user 12 is associated with profile-specific capabilities to be used in rendering interface-specific representations 52 of session items 20 exchanged with the user 12, the communication session server 54 may apply these profile-specific capabilities. For example, upon receiving a session item 20 from the user 12, the communication session server 54 may render the session item 20 according to the profile-specific capabilities of the user profile of the user 12 (e.g., automatically transforming video into text pursuant to a text input capability); and upon receiving a session item 20 from another user 12 to be delivered to the user 12 with profile-specific capabilities, the communication session server 54 may accordingly render the interface-specific representation 54 of the session item 20 according to the profile-specific capabilities of the user 12.

Figure 9:
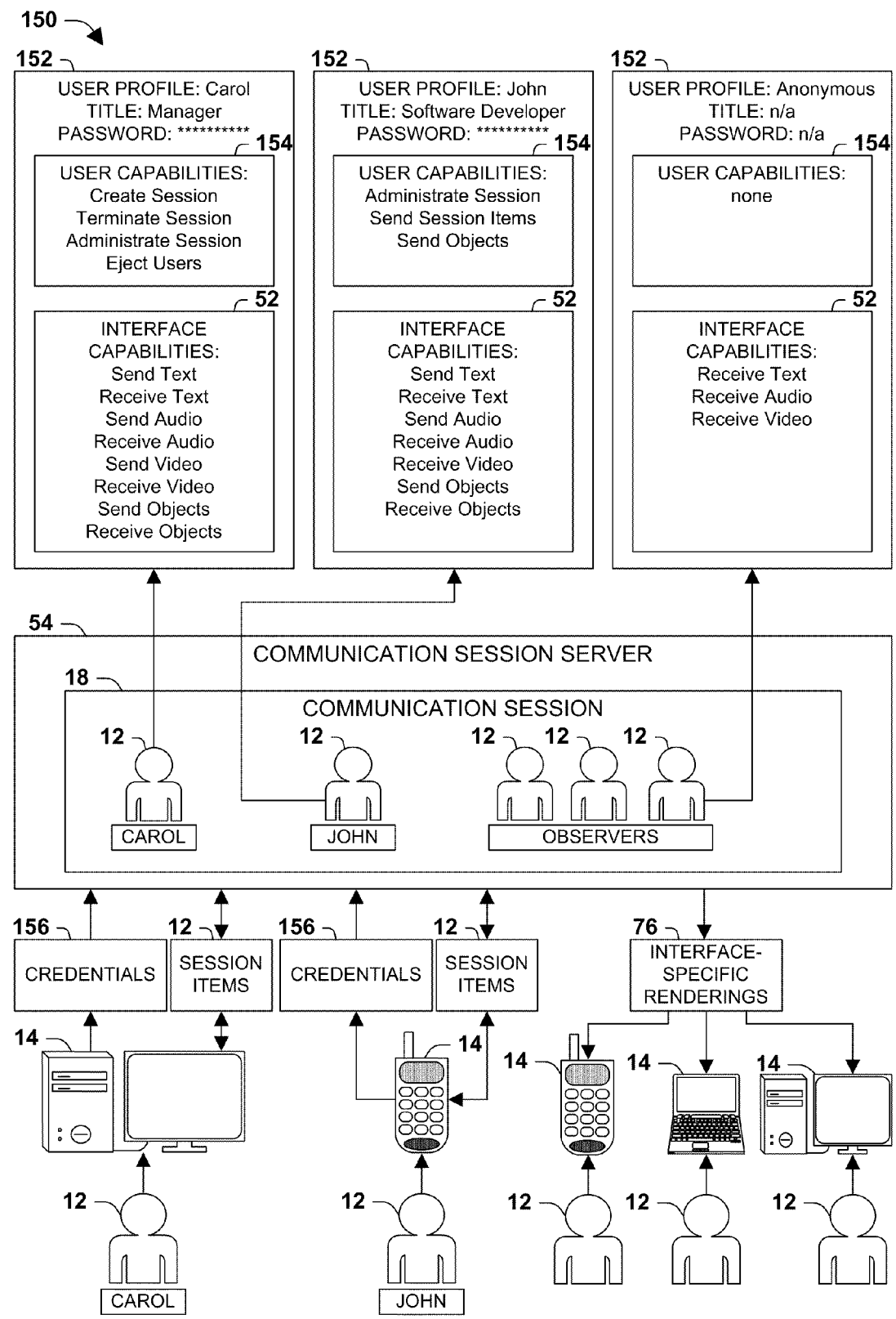
FIG. 9 is an illustration of an exemplary scenario featuring a communication session among a set of users associated with various user profiles.

FIG. 9 presents an exemplary scenario 150 featuring a communication session server 54 that utilizes several of these techniques in managing the state of the communication session 18. In this exemplary scenario 150, the communication session server 102 comprises two user profiles 152, each specifying some details about a particular user 12, such as the name and role of the user 12. Each user profile 152 also specifies various administrative capabilities 154 that may be performed by a user 12 associated with each user profile 152, and also the interface capabilities 52 that may be utilized by a user 12 of each user profile 152 to participate in the communication session 18. Additionally, each user profile 152 features a password that is used as an authenticating credential.

The communication session server 102 also includes an anonymous user profile 152 that any user 12 may utilize (featuring no password), but that confers no administrative capabilities 154 and that only permits interface capabilities 54 that permit limited observation of the communication session 18. When various users 12 request to join the communication session 18, the communication session server 54 may associate each user 12 with the appropriate user profile 152, administrative capabilities 154, and interface capabilities 52. For example, a first user 12 may request to utilize the first user profile 152, and may submit credentials 156 (such as a password) that the communication session server 54 may utilize to authenticate the identity of the user 12. Upon verifying the credentials 156 of the user 12, the communication session server 54 may identify this user 12 to the other users 12 in the communication session 18 according to the user profile 152, and may confer upon the first user 12 the administrative capabilities 154 and the interface capabilities 52 thereof. By contrast, when other users 12 request to join the communication session 18 but do not submit credentials 156 matching any user profile 152, the communication session server 54 may join such users 12 to the communication session 18 under the anonymous user profile 152, thereby permitting such users 12 to observe the communication session 18 (e.g., by associating with such users 12 the interface capabilities 52 of receiving text, audio, and video), but denying such users 12 any administrative capabilities 154 or any interface capabilities 54 relating to sending session items 20 into the communication session 18. In this manner, the communication session server 54 may facilitate the identification and identity authentication of various users 12 in the communication session 18, the anonymization of various users 12, and the assignment of roles and capabilities 52 for various users 12.

As a fourth example of this third aspect, the communication session server 54 may be configured to accept operations from users 12 that alter various aspects of the communication session 18. For example, users 12 may be permitted to issue commands to the communication session server 54 to initiate or terminate a communication session 18; to join or evict particular other users 12; and to adjust the capabilities of other users 12, including the administrative capabilities 152 and the interface capabilities 52. A comparatively simple embodiment of these techniques may, upon receiving the operation from a user 12 that relates to the communication session 18, instruct the communication session server 54 to perform the operation on the communication session 18.

More sophisticated embodiments of this fourth example may implement variations of this fourth example. In a first such embodiment, respective operations that may be performed on the communications session 18 may utilize various administrative capabilities, such as the administrative capability to alter the communication session 18 and the administrative capability to manage other users 18 of the communication session 18. Moreover, respective users 12 of the communication session 18 may comprise zero or more administrative capabilities, which may be assigned, e.g., according to the user profile 152 associated with the user 12 (as in the exemplary scenario 150 of FIG. 9), or according to roles assigned on an ad hoc basis (e.g., the first user 12 to join a communication session 18 may be designated as the first administrator of the communication session 18, and other users 12 may be designated as participants unless granted other roles or administrative capabilities 154 by an administrator.) The communication session server 52 may therefore verify the administrative capabilities 152 of a user 12 before applying any operation requested by the user 12. For example, the communication session server 52 may be configured to, upon receiving an operation from a user 12, identify the administrative capabilities 152 utilized by the operation; identify the administrative capabilities 152 associated with the user 12; and may perform the operation on the communication session 18 after verifying that the user 12 comprises the administrative capabilities 152 utilized by the operation.

In some embodiment of this fourth example of this third aspect, the communication session server 54 may be configured to receive operations specified in a text format. For example, the communication session server 54 may be configured to accept text operations in one or more text communication protocols, such as an email communication protocol, an instant message protocol, a short message service (SMS) communication protocol, and a hypertext transport communication protocol (such as HTTP, e.g., if the communication session 18 is implemented as a RESTful service.) Because many devices 14 support text entry, the capability of the communication session server 54 to accept text operations may be particularly convenient. For example, a communication session server 54 capable of accepting text operations may be administrated by users 12 operating such diverse interfaces 16 as email clients, instant messaging clients, SMS clients, and web browsers. Moreover, the communication session server 54 may be configured to facilitate the entry and acceptance of such text operations, e.g., by featuring a fairly simple and concise command set that may be comparatively easy to enter into a text interface such as a T9-based mobile phone texting system, and to compensate for typographical and syntactic errors by comparing the text operation to known text operations (e.g., using an approximating or degree-of-similarity string-matching algorithm), and by identifying a known text operation that at least approximately syntactically matches the text operation.

Communication session servers 54 may be configured to accept and apply many types of operations according to this fourth example of this third aspect. As a first example, the operation may comprise an invitation to add a user 12 of at least one device 14 to the communication session 18. The communication session server 54 may fulfill this operation by sending an invitation to a device 14 of the invited user 12 (e.g., by sending an SMS text invitation to a mobile phone of the user 12, or by sending an email message to an email account of the user 12), and upon receiving from the user 12 an acceptance of the invitation, by joining the user 12 with the communication session 18. As a second example, the operation may comprise a request from a first user 12 to share at least a portion of his or her user profile 152 with one or more other users 12. The communication session server 54 may fulfill this operation by representing the first user 12 to the other users 12 according to the specified portion of the user profile 152, e.g., by revealing the name, title, administrative capabilities 154, and/or interface capabilities 52 of the first user 12 to the other users 12. For example, the first user 12 may have initially joined the communication session 18 with a user profile 152, but may have initially requested the communication session server 54 to represent the user 12 to other users 12 with an anonymous user profile 152. If the first user 12 later begins to trust a second user 12, the first user 12 may request the communication session server 54 to reveal particular aspects of the first user's user profile 152 to the second user 12. The revelation of such information to the second user 12 by the communication session server 54 may be more trustworthy, reliable, and/or verifiable to the second user 12 than an unverifiable assertion of such information by the first user 12.

Figure 10:
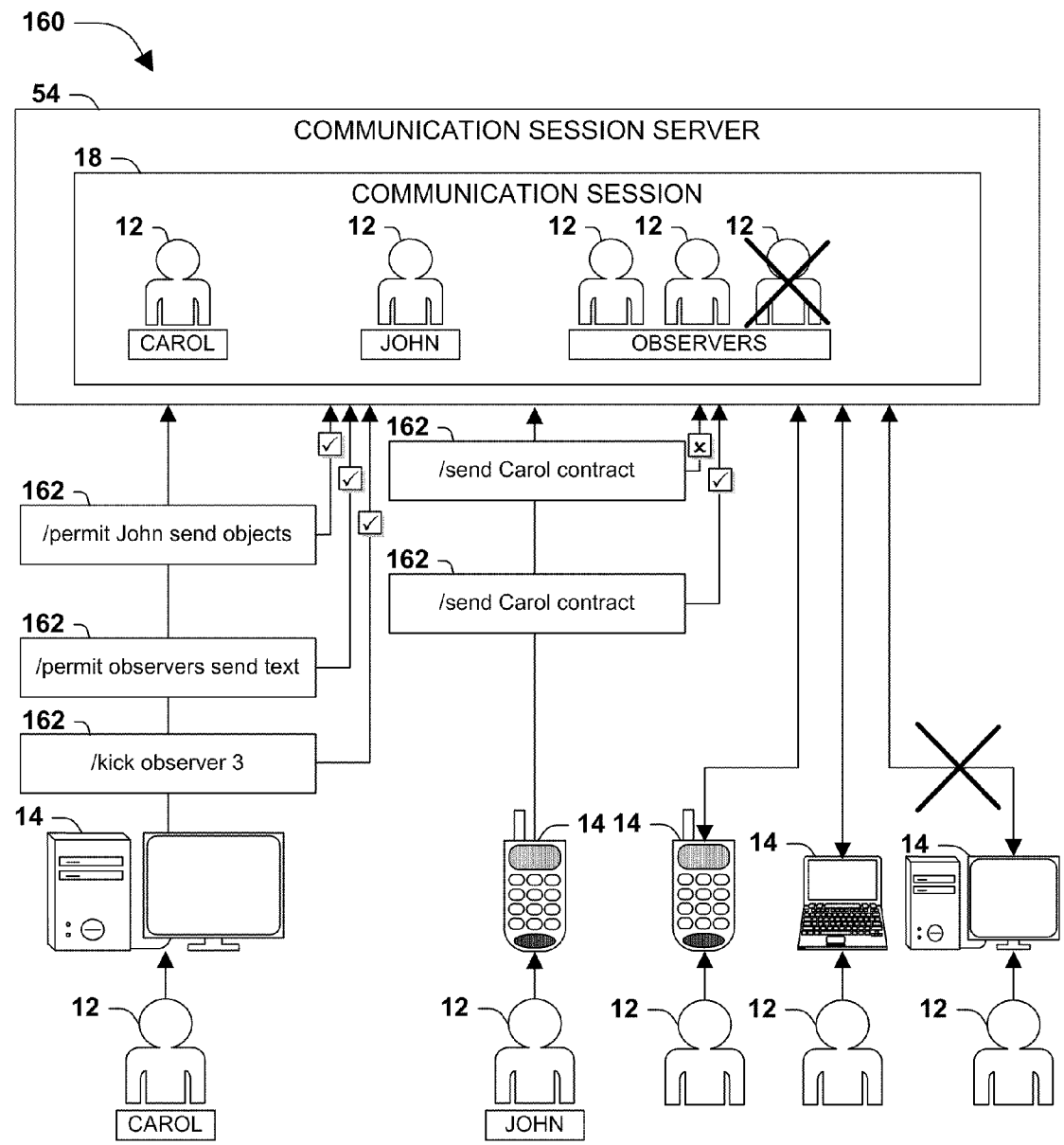
FIG. 10 is an illustration of an exemplary scenario featuring a communication session among a set of users submitting to a communication session server a set of text operations for managing the communication session.

FIG. 10 presents an illustration of an exemplary scenario 160 featuring a communication session server 54 that is configured to accept and apply operations 162 specified by various users 12 based on several of these techniques. As a first example, the communication session server 54 is configured to accept operations 162 specified in a comparatively simple text format, which may facilitate the submission of operations 162 from devices 14 and interfaces 16 with comparatively basic text input capabilities 52, such as a T9 text interface 16 presented on the mobile phone device 14 operated by the second user 12. As a second example, the users 12 represented in the exemplary scenario 160 of FIG. 12 may be associated with the same user profiles 152 illustrated in the exemplary scenario 150 FIG. 11, and each user 12 may therefore be associated with a particular set of administrative capabilities 154. Accordingly, when a user 12 requests an operation 162 to be performed on the communication session 18, the communication session server 54 may identify the administrative capabilities 154 involved in the operation 162, and may verify that the user 12 submitting the operation 162 is associated with the corresponding set of administrative capabilities 154. For example, the second user 12 may submit a first text operation 162 requesting to send to the first user 12 a particular data object. However, the user profile 152 of the second user 12 may initially not include the "send data object" capability, and the communication session server 54 may refuse to apply the operation. However, the first user 12 (occupying an administrator role with many administrative capabilities 154) may wish to receive this data object from the second user 12, and so may request an operation 162 that grants the second user 12 the administrative capability 154 of sending data objects. The communication server 54 may (after verifying the administrative capability 162 of the first user 12 to alter the administrative capabilities 162 of other users 12 in the communication session 18) so grant this administrative capability 162 to the second user 12, and when the second user 12 again requests an operation 162 to send the data object to the second user 12, the communication session server 54 may verify and fulfill this operation 162. The first user 12 may also be associated with the administrative capability 162 of evicting users 12 from the communication session 18, such as an operation 162 requesting the communication session 54 to evict the third observer user 12 from the communication session 18. Additionally, the communication session server 54 may endeavor to correct syntactic errors in the text operations 162; e.g., when the first user 12 requests to grant the second user 12 the administrative capability 154 to send "objects," the communication session server 54 may fail to identify a known operation 162 that exactly matches this requested text operation 162, but may approximately match the text operation 162, with a high degree of confidence, to a known operation 162 to allow a user 12 to send data objects, and may therefore apply this known operation 162 to the communication session 18. In this manner, the communication session server 54 may implement error correction to facilitate the entry of text operations 162 on many devices with text input capabilities.

As a fifth example of this third aspect, the communication session server 54 may be configured to adapt to changes in the devices 14 and interfaces 16 of various users 12. In a first such embodiment, the communication session server 54 may identify which users 12 are participating in a particular interface 16 on a particular device 14. For example, a communication session server 54 having a biometric measurement recognition component may identify the individuals visible in a video stream, and when new individuals enter the video stream or when present individuals leave, the communication session server 54 may announce such arrivals and departures to the other users 12 in the communication session 18. In a second such embodiment, the communication session server 54 may permit users 12 to switch interfaces 16 and devices 14, and may correspondingly adapt the participation of the user 12 in the communication session 18. For example, upon detecting a transition of a user 12 participating in the communication session 18 from a first interface 16 of a device 14 to a second interface 16 of the same or a different device 16, the communication session server 54 may identify the capabilities 54 of the second interface 16 and the device 14, and may subsequently deliver session items 20 to the user 12 by rendering interface-specific representations 76 based on the capabilities 54 of the second interface 16. This adaptation might be achievable even without notifying the other users 12 of the change of interfaces 18 and/or devices 16 by the user 12. Such adaptations are difficult or incompatible with servers providing other types of communication sessions (particularly servers providing a particular communication session type, such as those illustrated in the exemplary scenario 10 of FIG. 1), but may be readily achievable by communications session servers 54 configured according to the techniques discussed herein.

Figure 11:
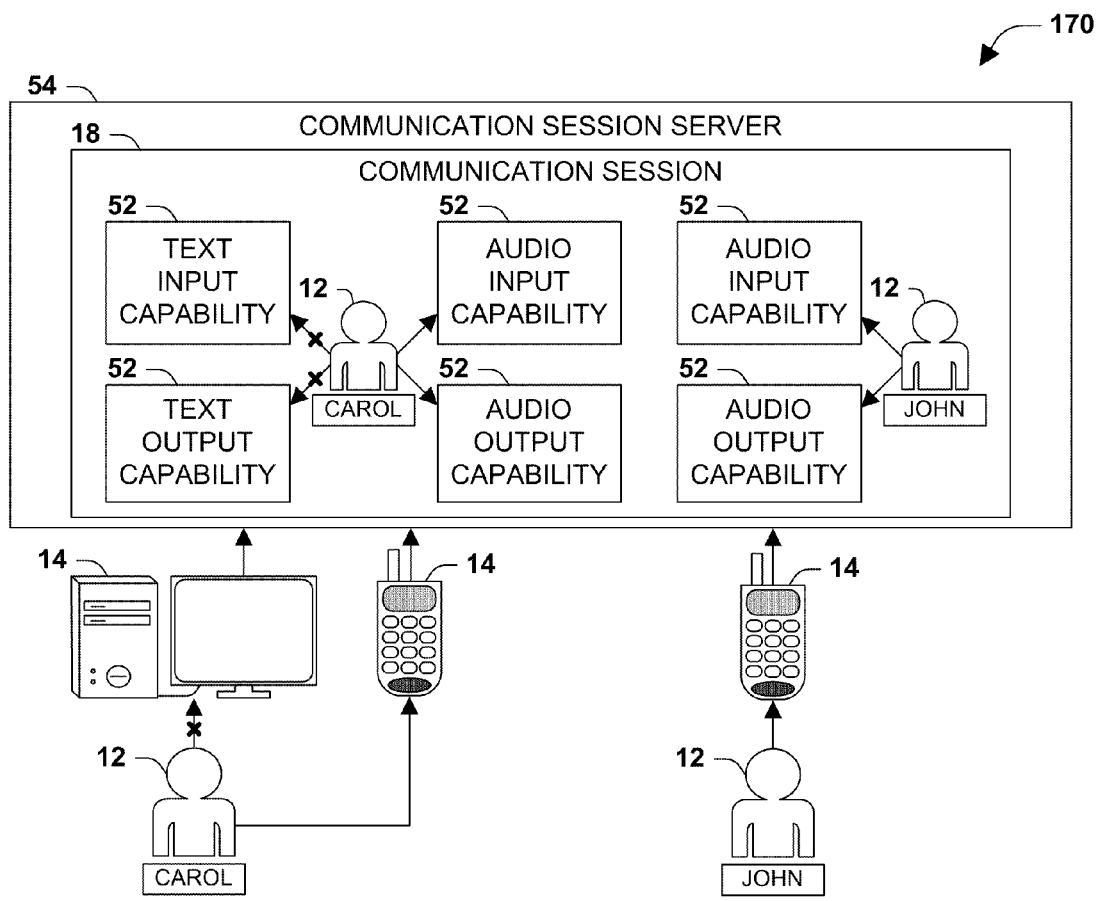
FIG. 11 is an illustration of an exemplary scenario featuring a communication session server configured to detect and handle an interface transition of a user during a communication session.

FIG. 11 presents an exemplary scenario 170 featuring an interface transition by a user 12 of a communication session 18. In this exemplary scenario 170, a first user 12 is initially connected to the communications session 18 through a workstation device 14 via an interface 16 that features a text input capability 52 and a text output capability 52 (such as an instant messaging client), and may be communicating with a second user 12 who is participating in the communication session 18 using a mobile phone device 14 having an interface 16 featuring an audio input capability 52 and an audio output capability 52. Accordingly, the communication session server 54 may present a "mixed" communication session 60, wherein the text input of the first user 12 is automatically translated into synthesized speech for delivery to the second user 12, and where speech input received from the second user 12 is automatically converted to text for delivery to the first user 12. However, the first user 12 may choose to transition to a mobile phone device 12, e.g., in order to move to a new location without leaving the communication session 18. The communication session server 54 may identify the interface transition of the first user 12, and within its representation of the communication session 18, may discard the text input capability 52 and the text output capability 52 associated with the interface 16 of the workstation device 14. Instead, the communication session server 54 may associate with the first user 12 an audio input capability 52 and an audio output capability 52, and may adjust its rendering of interface-specific representations 76 of session items 20 for exchange with the mobile phone device 14. The communication session server 54 might also notify the second user 12 of the interface transition of the first user 12, and/or may alter the communication session 18 by permitting a direct voice-to-voice communication between the users 12. Alternatively, the communication session server 54 might hide the interface transition from the second user 12, e.g., by interpreting the voice input of the first user 12 as text, and then synthesizing voice input for delivery to the second user 12. In this manner, the communication session server 54 may facilitate device and interface transitions of various users 12 during the communication session 18 in a flexible manner. Those of ordinary skill in the art may also devise other ways of configuring the communication session server 54 to participate in the management of the communication session 18 in accordance with the techniques discussed herein.

A fourth aspect that may vary among embodiments of these techniques relates to the presentation of the interface-specific representations 76 of the session items 20 to the users 12 of the communication session 18 through the respective interfaces 16 and devices 14. As a first example, many types of instance-specific representations 76 might be rendered based on a particular session item 20. For example, the communication session server 54 might receive from a first user 12 a set of session items 18 comprising text, and may endeavor to render interface-specific representations 76 for a second user 12 of a device 14 and interface 16 having a video output capability, such as a television. The text may be rendered in many ways, e.g., by simply displaying a new block of text; by animating the text to appear as if typed (as in the exemplary transformed session item 36 in the first example 30 of FIG. 2); or by presenting the text in a threaded manner, such as under an avatar representing the user 12 who sent the text (as in the video rendering 70 in the exemplary scenario 60 of FIG. 4.) As another example, session items 20 comprising segments of an audio and video stream may be represented to a user 12 of a device 14 having only a text input capability 52 in various ways, e.g., by simply translating spoken words to text, and/or by identifying significant gestures within the video and/or biometrically identifying individuals present in the video.

As a second example of this fourth aspect, because the session items 20 often comprise a conversation within the communication session 18, various session items 20 may have a responsive relationship with other session items 20. For example, a first text session item 20 submitted as an email message may prompt a reply email message that is represented as a second text session item 20. Such responsive relationships may be specified by the user 12 who authored the session item 20 (e.g., "this message is in reply to that message"), or may be inferred from the semantic content or metadata of the session item 20 (e.g., by identifying a quoted portion of a first email message as the body of a second email message.) Embodiments of these techniques may be configured to detect such responsive relationships, and, with an interface-specific representation 76 of a first session item 20, may also send an indication of a responsive relationship with a second session item 20. The interfaces 16 of the devices 14 operated by the users 12 may then include the responsive relationship indications in the presentation of the communication session 18 to the user 12, e.g., by displaying the session items 20 in a "threaded" manner.

As a third example of this fourth aspect, a communication session server 54 may comprise a session item store that is configured to store the session items 20 of a communication session 18, and may be configured to, upon receiving a session item 20 for the communication session 18, store the session item 18 in the session item store. The stored session items 20 may then be utilized by the communication session server 54 in many ways. As a first embodiment of this third example, a communication session server 54 may accept requests from various users 12 to view an excerpt, summary, digest, or transcript of the communication session 18, either during the communication session 18 or after the communication session 18 has terminated, and the users 12 may or may not be (or have been) participants in the communication session 18. Moreover, the users 12 submitting such requests may operate a particular device 14 featuring an interface 16. For sessions that are not publicly accessible, the communication session server 54 might first verify that the user 12 submitting the request has permission to view the communication session 18. If the request is deemed permissible, the communication session server 54 may fulfill such requests by retrieving the session items 20 associated with the communication session 18 from the session item store, by identifying the capabilities 52 of the interface 16, and by presenting the session items 20 to the user 12 in an interface-specific manner (e.g., by rendering interface-specific representations 76 of the respective session items 20 according to the capabilities 76 of the interface 16, and sending the interface-specific representations 76 of the session items 20 to the user 12 via the interface 16.) If so requested by the user 12, the communication session server 54 might also apply various search criteria, filters, sorting, and/or ordering (e.g., by priority or chronology), or summarizing to the presented session items 20. In this manner, the communication session server 54 may use the session item store to render on behalf of a user 12 a replay, report, or digest-based updating of a communication session 18.

Figure 12:
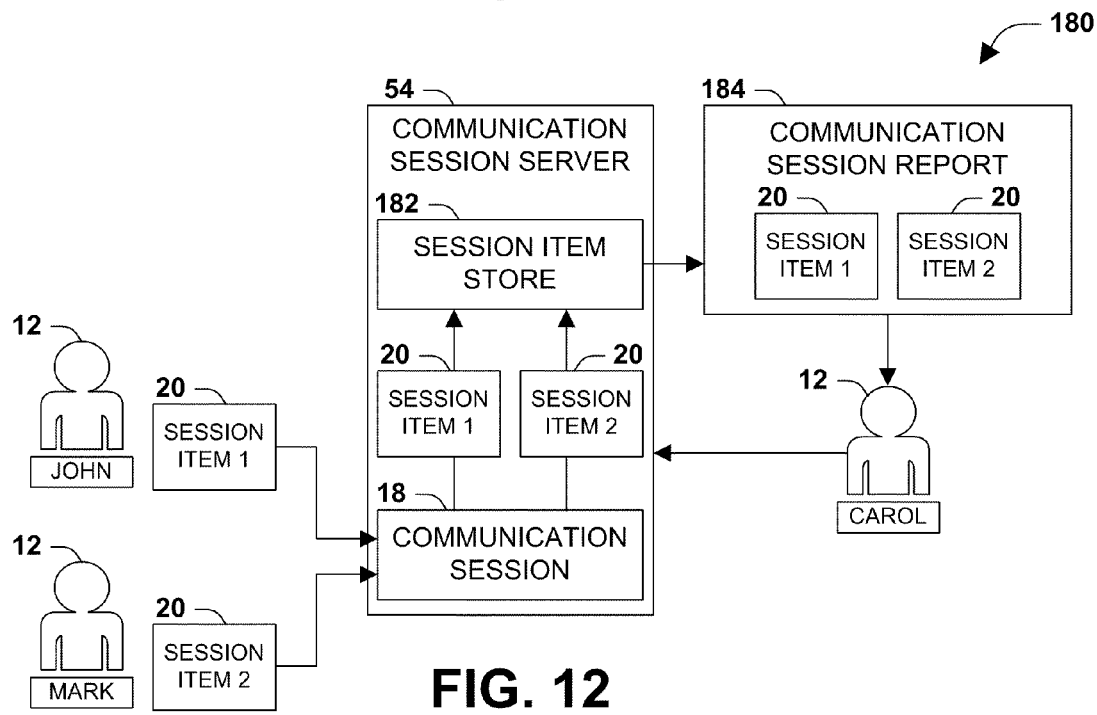
FIG. 12 is an illustration of an exemplary scenario featuring the generation of a communication session report of a communication session for a user.

FIG. 12 presents an exemplary scenario 180 featuring the replaying of a session item 20 on behalf of a user 12. In this exemplary scenario 180, a first user 12 and a second user 12 may submit various session items 20 comprising a communication session 18, and the communication session server 54 may store such session items 20 in a session item store 182. Later, a third user 12 may request from the communication session server 54 a communication session report 184, comprising the set of session items 20 submitted by the first user 12 and the second user 12 during the communication session 18. Upon verifying that the third user 12 is permitted to access the session items 20 comprising the communication session 18, the communication session server 54 may retrieve the session items 20 from the session item store 182 and, based on the detected capabilities 52 of the device 14 and interface 16 of the third user 12, may render interface-specific representations 76 of the session items 20, thereby presenting to the thirds user 12 a communication session report 184 that is appropriately rendered for the device 12 and interface 14 of the third user 12.

As a second embodiment of this third example of this fourth aspect, in some cases, the communication session server 54 may receive a session item that simply cannot be rendered as an interface-specific representation 76 for a particular interface 16 and/or device 14. Instead, the communication session server 54 may store the session item 20 in the session item store and notify the user 18 of the incompatible interface 16 and/or device 14 (via the interface 16) of the receipt of the session item 20, and the storing thereof. Later, upon receiving from the user 12, via a second interface 16 (of the same or another device 14) that is capable of rendering the session item 20, a request to access the session item 20, the communication session server 54 may retrieve the session item 20 from the session item store and render it for the user 12 (e.g., by identifying at least one capability 52 of the new interface 16, by rendering an instance-specific representation 76 of the session item 20 according to the capabilities 52 of the new interface 16, and by send the instance-specific representation 76 to the user 12 via the new interface 16.) For example, in the exemplary scenario 60 of FIG. 4, the fourth user 12 shares a document with the other users 12, but the third user 12 is operating a telephone device 14 having a simple telephone interface 16, and the communication session server 54 cannot meaningfully render the document as an interface-specific representation 76. Instead, the communication session server 52 may notify the third user 12 of the availability of the document, and when the third user 12 later requests the document from another device (such as a workstation computer), the communication session server 54 may provide the document to the third user 12. Those of ordinary skill in the art may devise many techniques for presenting the communication session 18 to a user 12 in accordance with the techniques discussed herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used in this application, the terms "component," "module," "system", "interface", and the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, those skilled in the art will recognize many modifications may be made to this configuration without departing from the scope or spirit of the claimed subject matter.

Figure 13:
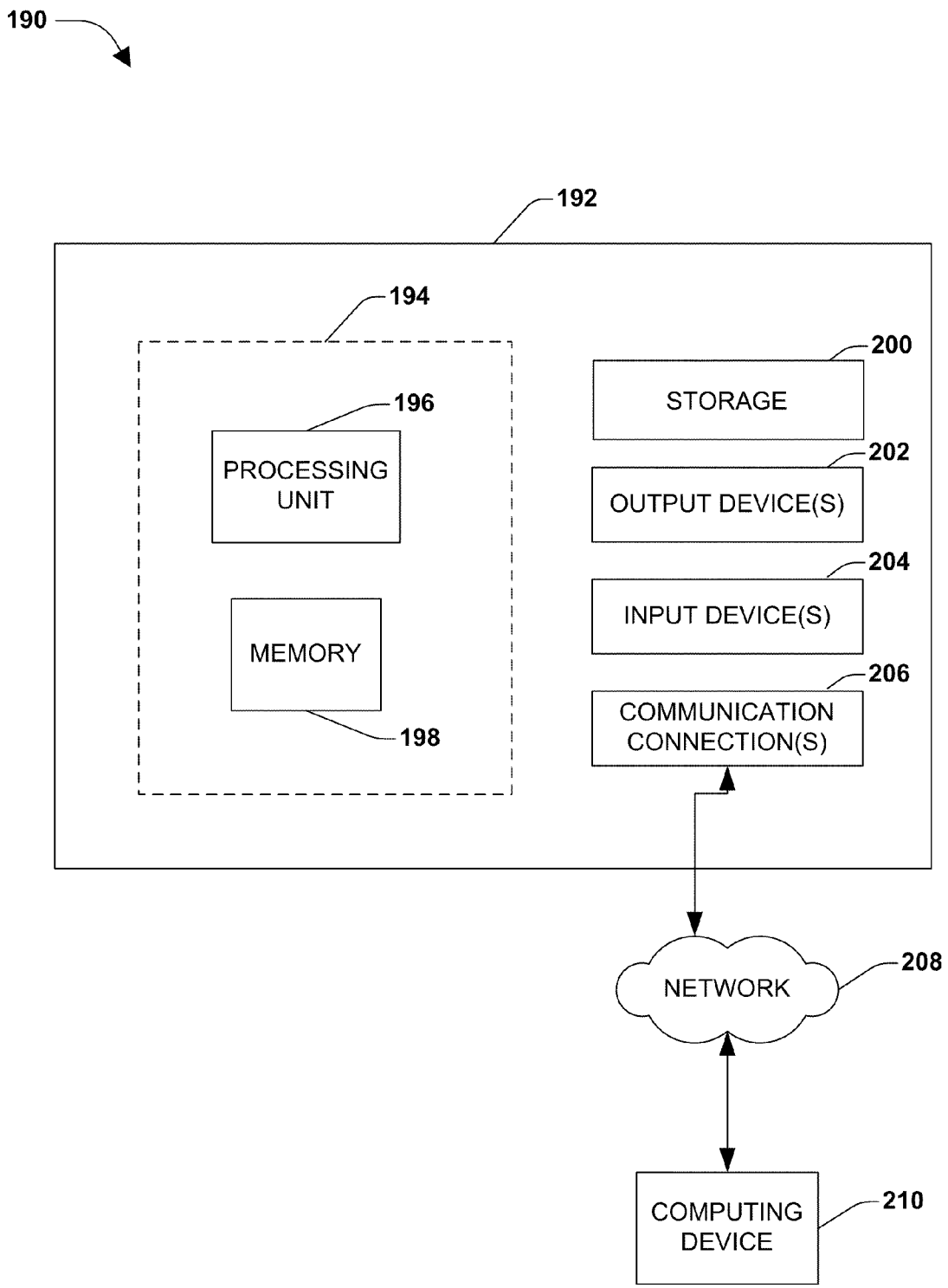
FIG. 13 illustrates an exemplary computing environment wherein one or more of the provisions set forth herein may be implemented.

FIG. 13 and the following discussion provide a brief, general description of a suitable computing environment to implement embodiments of one or more of the provisions set forth herein. The operating environment of FIG. 13 is only one example of a suitable operating environment and is not intended to suggest any limitation as to the scope of use or functionality of the operating environment. Example computing devices include, but are not limited to, personal computers, server computers, hand-held or laptop devices, mobile devices (such as mobile phones, Personal Digital Assistants (PDAs), media players, and the like), multiprocessor systems, consumer electronics, mini computers, mainframe computers, distributed computing environments that include any of the above systems or devices, and the like.

Although not required, embodiments are described in the general context of "computer readable instructions" being executed by one or more computing devices. Computer readable instructions may be distributed via computer readable media (discussed below). Computer readable instructions may be implemented as program modules, such as functions, objects, Application Programming Interfaces (APIs), data structures, and the like, that perform particular tasks or implement particular abstract data types. Typically, the functionality of the computer readable instructions may be combined or distributed as desired in various environments.

FIG. 13 illustrates an example of a system 190 comprising a computing device 192 configured to implement one or more embodiments provided herein. In one configuration, computing device 192 includes at least one processing unit 196 and memory 198. Depending on the exact configuration and type of computing device, memory 198 may be volatile (such as RAM, for example), non-volatile (such as ROM, flash memory, etc., for example) or some combination of the two. This configuration is illustrated in FIG. 13 by dashed line 194.

In other embodiments, device 192 may include additional features and/or functionality. For example, device 192 may also include additional storage (e.g., removable and/or non-removable) including, but not limited to, magnetic storage, optical storage, and the like. Such additional storage is illustrated in FIG. 13 by storage 200. In one embodiment, computer readable instructions to implement one or more embodiments provided herein may be in storage 200. Storage 200 may also store other computer readable instructions to implement an operating system, an application program, and the like. Computer readable instructions may be loaded in memory 198 for execution by processing unit 196, for example.

The term "computer readable media" as used herein includes computer storage media. Computer storage media includes volatile and nonvolatile, removable and non-removable media implemented in any method or technology for storage of information such as computer readable instructions or other data. Memory 198 and storage 200 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which can be used to store the desired information and which can be accessed by device 192. Any such computer storage media may be part of device 192.

Device 192 may also include communication connection(s) 206 that allows device 192 to communicate with other devices. Communication connection(s) 206 may include, but is not limited to, a modem, a Network Interface Card (NIC), an integrated network interface, a radio frequency transmitter/receiver, an infrared port, a USB connection, or other interfaces for connecting computing device 192 to other computing devices. Communication connection(s) 206 may include a wired connection or a wireless connection. Communication connection(s) 206 may transmit and/or receive communication media.

The term "computer readable media" may include communication media. Communication media typically embodies computer readable instructions or other data in a "modulated data signal" such as a carrier wave or other transport mechanism and includes any information delivery media. The term "modulated data signal" may include a signal that has one or more of its characteristics set or changed in such a manner as to encode information in the signal.

Device 192 may include input device(s) 204 such as keyboard, mouse, pen, voice input device, touch input device, infrared cameras, video input devices, and/or any other input device. Output device(s) 202 such as one or more displays, speakers, printers, and/or any other output device may also be included in device 192. Input device(s) 204 and output device(s) 202 may be connected to device 192 via a wired connection, wireless connection, or any combination thereof. In one embodiment, an input device or an output device from another computing device may be used as input device(s) 204 or output device(s) 202 for computing device 192.

Components of computing device 192 may be connected by various interconnects, such as a bus. Such interconnects may include a Peripheral Component Interconnect (PCI), such as PCI Express, a Universal Serial Bus (USB), firewire (IEEE 1394), an optical bus structure, and the like. In another embodiment, components of computing device 192 may be interconnected by a network. For example, memory 198 may be comprised of multiple physical memory units located in different physical locations interconnected by a network.

Those skilled in the art will realize that storage devices utilized to store computer readable instructions may be distributed across a network. For example, a computing device 210 accessible via network 208 may store computer readable instructions to implement one or more embodiments provided herein. Computing device 192 may access computing device 210 and download a part or all of the computer readable instructions for execution. Alternatively, computing device 192 may download pieces of the computer readable instructions, as needed, or some instructions may be executed at computing device 192 and some at computing device 210.

Various operations of embodiments are provided herein. In one embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein.

Moreover, the word "exemplary" is used herein to mean serving as an example, instance, or illustration. Any aspect or design described herein as "exemplary" is not necessarily to be construed as advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims may generally be construed to mean "one or more" unless specified otherwise or clear from context to be directed to a singular form.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the disclosure. In addition, while a particular feature of the disclosure may have been disclosed with respect to only one of several implementations, such feature may be combined with one or more other features of the other implementations as may be desired and advantageous for any given or particular application. Furthermore, to the extent that the terms "includes", "having", "has", "with", or variants thereof are used in either the detailed description or the claims, such terms are intended to be inclusive in a manner similar to the term "comprising."

What is claimed is:

1. A method of hosting a communication session using a processor of a server connected to a first device and a second device presenting the communication session to a user, the method comprising:
   executing on the processor instructions configured to:
   identify at least one capability of an interface of the second device; and
   select an interface modality supported by the at least one capability of the interface; and
   upon receiving from the first device a session item provided in a native modality for the communication session to be sent to the second device having an interface modality that is different from the native modality:
   translate the session item into an interface-specific representation of the session item in the interface modality in which the second device is capable of presenting the session item to the user, and
   send the interface-specific representation of the session item to the second device for presentation to the user through the interface of the second device in the interface modality.

2. The method of claim 1, respective capabilities of respective interfaces selected from a set of interface capabilities comprising:
   a text input capability;
   an image input capability;
   an audio input capability;
   a motion video input capability;
   a data object sending capability;
   a web rendering capability;
   a text output capability;
   an image output capability;
   an audio output capability;
   a motion video output capability; and
   a data object receiving capability.

3. The method of claim 1, the instructions configured to:
   initiate the communication session;
   upon receiving a request from at least one user of a device to join the communication session, join the at least one user of the device with the communication session;
   upon receiving a request from at least one user of a device to exit the communication session, exit the at least one user of the device from the communication session; and
   upon exiting all users from a communication session, terminate the communication session.

4. The method of claim 3:
   at least one user of the communication session having a user profile describing the at least one user and verified according to at least one authentication credential; and
   the instructions configured to, upon receiving a request from at least one user to join the communication session with the user profile:
   receive from the at least one user at least one authorization credential, and
   upon verify the authorization credential with the user profile, join the at least one user to the communication session with the user profile.

5. The method of claim 4:
   at least one user profile of at least one first user specifying at least one profile-specific capability of the interface of the at least one first user to be used in rendering the interface-specific representation of session items exchanged with the at least one first user;

selecting the interface modality further comprising: an interface modality that is supported by the at least one profile-specific capability of the interface;

the instructions configured to, upon receiving a first session item from the at least one first user, render the first session item in the interface modality selected according to the at least one profile-specific capability of the user profile of the at least one first user; and rendering an interface-specific representation of a second session item received from at least one second user for sending to the interface of the at least one first user comprising: rendering an interface-specific representation of the second session item in the interface modality selected according to the at least one profile-specific capability of the interface of the second user.

6. The method of claim 3, joining at least one user of a device with the communication session comprising: joining the at least one user of the communication session with an anonymous user profile.

7. The method of claim 1, the instructions configured to, upon receiving from at least one user at least one operation relating to the communication session, perform the operation on the communication session.

8. The method of claim 7:
respective users of the communication session comprising at least zero administrative capabilities;
respective operations that may be performed on the communication session utilizing at least zero administrative capabilities; and
performing the operation comprising:
identify the at least zero administrative capabilities utilized by the operation;
identify the at least zero administrative capabilities of the at least one user sending the operation; and
upon verifying that the at least one user comprises the at least zero administrative capabilities utilized by the operation, perform the operation on the communication session.

9. The method of claim 7, the communication session server configured to receive at least one text operation specified in a text format.

10. The method of claim 9, the communication session server configured to receive the at least one text operation in at least one text communication protocol selected from a set of text communication protocols comprising:
an email communication protocol;
an instant message protocol;
a short message service communication protocol; and
a hypertext transport communication protocol.

11. The method of claim 9, the communication session server configured to, upon receiving from at least one user of the communication session a text operation:
compare the text operation to known text operations, and
upon identifying a known text operation that at least approximately syntactically matches the text operation, perform the text operation on the communication session.

12. The method of claim 7:
the operation comprising an invitation to add a user of at least one device to the communication session; and
performing the operation on the communication session comprising:
sending the invitation to at least one device of the user; and
upon receiving from the user an acceptance of the invitation, joining the user with the communication session.

13. The method of claim 7:
at least one first user of the communication session having a user profile describing the at least one first user;
the operation comprising a request to share at least a portion of the user profile with at least one second user; and
performing the operation on the communication session comprising: representing to the at least one second user the at least one first user according to the at least a portion of the user profile.

14. The method of claim 1, the instructions configured to, upon detecting a transition of a first user participating in the communication session from a first interface of a device to a second interface of a device:
identify at least one capability of the second interface of the device, and
upon receiving a session item from a second user of the communication session:
render an interface-specific representation of the session item in the interface modality selected according to the at least one capability of the second interface of the device, and
send the interface-specific representation of the session item to the second interface.

15. The method of claim 1:
at least one first session item having a responsive relationship with at least one second session item; and
the instructions configured to send the interface-specific representation of the first session item to the at least one user via the interface with an indication of the responsive relationship of the first session item with the second session item.

16. The method of claim 1:
the communication session server comprising a session item store configured to store at least one session item of the communication session; and
the instructions configured to, upon receiving a session item for the communication session, store the session item in the session item store.

17. The method of claim 16, the instructions configured to, upon receiving from at least one user of the communication session a request to view the communication session, the at least one user operating a device having at least one interface:
retrieve from the session item store at least one session item associated with the communication session, and
for respective session items:
render an interface-specific representation of the session item in the interface modality according to at least one capability of the interface, and
send the interface-specific representation of the session item to the at least one user via the interface.

18. The method of claim 16, the instructions configured to, upon receiving from a first user a session item that cannot be rendered as an interface-specific representation according to at least one capability of a first interface operated by a second user:
store the session item in a session item store;
notify the second user via the first interface of the session item; and
upon receiving from the second user via a second interface of a device a request to access the session item:
retrieve from the session item store the session item associated with the communication session;
identify at least one capability of the second interface;
render an instance-specific representation of the session item in the interface modality selected according to at least one capability of the second interface; and send the instance-specific representation of the session item to the second user via the second interface.

19. A system configured to host a communication session on a server connected to a first device and a second device presenting the communication session to a user, the system comprising:
- a capability identifying component configured to:
  - identify at least one capability of an interface of the second device; and
  - select an interface modality in which the second device is capable of using the at least one capability of the interface to present the session item to the user;
- an interface-specific rendering component configured to, upon receiving a session item provided in a native modality for the communication session to be sent to one of the respective interfaces, where the native modality is different from the interface modality, translate the session item from the native modality into the interface modality to generate an interface-specific representation of the session item; and
- a session item sending component configured to send interface-specific representations of session items to the second device for presentation in the interface modality to the user through the interface of the second device.

20. A computer-readable memory device storing instructions that, when executed on a processor of a server connected to at least two devices respectively having an interface presenting the communication session to a user, cause the server to host a communication session among the at least two devices, by:
- identifying at least one capability of the interface of the second device; and
- selecting an interface modality supported by the at least one capability of the interface; and
- upon receiving a session item provided in a native modality for the communication session to be sent to one of the interfaces, where the native modality is different from the interface modality:
- translating the session item into an interface-specific representation of the session item in the interface modality in which the second device is capable of presenting the session item to the user, and
- sending the interface-specific representation of the session item to the second device for presentation to the user through the interface of the second device in the interface modality.

* * * * *